US009047694B2

(12) United States Patent
Sasaki

(10) Patent No.: US 9,047,694 B2
(45) Date of Patent: Jun. 2, 2015

(54) IMAGE PROCESSING APPARATUS HAVING A PLURALITY OF IMAGE PROCESSING BLOCKS THAT ARE CAPABLE OF REAL-TIME PROCESSING OF AN IMAGE SIGNAL

(71) Applicant: MegaChips Corporation, Osaka-shi (JP)

(72) Inventor: Gen Sasaki, Osaka (JP)

(73) Assignee: MEGACHIPS CORPORATION, Osaka-shi (JP)

( * ) Notice: Subject to any disclaimer, the term of this patent is extended or adjusted under 35 U.S.C. 154(b) by 0 days.

(21) Appl. No.: 14/329,455

(22) Filed: Jul. 11, 2014

(65) Prior Publication Data
US 2014/0321745 A1 Oct. 30, 2014

Related U.S. Application Data

(62) Division of application No. 13/091,838, filed on Apr. 21, 2011, now Pat. No. 8,810,675, which is a division of application No. 11/733,958, filed on Apr. 11, 2007, now abandoned.

(30) Foreign Application Priority Data

Apr. 21, 2006 (JP) ................................. 2006-118018

(51) Int. Cl.
*H04N 5/225* (2006.01)
*G06T 11/00* (2006.01)
(Continued)

(52) U.S. Cl.
CPC .............. *G06T 11/001* (2013.01); *H04N 1/409* (2013.01); *H04N 1/56* (2013.01); *H04N 5/23229* (2013.01);
(Continued)

(58) Field of Classification Search
CPC .................................................. H04N 5/23229

USPC .......................................................... 382/298
See application file for complete search history.

(56) References Cited

U.S. PATENT DOCUMENTS 6,226,397 B1    5/2001   Yamagata et al.
6,496,221 B1   12/2002   Wolf et al.
(Continued)

FOREIGN PATENT DOCUMENTS

JP        9-83823      3/1997
JP       10-42150      2/1998
(Continued)

OTHER PUBLICATIONS

Office Action issued May 31, 2011 in Japanese Application No. 2006-118018 (with partial English translation).
(Continued)

*Primary Examiner* — Twyler Haskins
*Assistant Examiner* — Dwight C Tejano
(74) *Attorney, Agent, or Firm* — Oblon, McClelland, Maier & Neustadt, L.L.P.

(57) ABSTRACT

An image processing apparatus is provided which offers higher versatility than conventional image processing apparatuses. When an input signal to a spatial filtering block is a monochrome signal that contains Y component only, a selector selects its input terminal and a selector selects its input terminal. Then, a low-pass filter output signal of a programmable spatial filter is inputted to a spatial filter, and a low-pass filter output signal of the spatial filer is inputted to a spatial filter. That is, the programmable spatial filter and the spatial filters are connected in series (in cascade), and the cascade-connected three spatial filters perform filtering operation. In this example, low-pass filters with 5H5 taps are connected in cascade in three stages, which enables low-pass filtering with 13H13 taps.

3 Claims, 17 Drawing Sheets

(51) Int. Cl.
*H04N 1/409* (2006.01)
*H04N 1/56* (2006.01)
*H04N 5/232* (2006.01)
*H04N 5/77* (2006.01)
*H04N 5/907* (2006.01)
*H04N 9/04* (2006.01)
*G06T 5/00* (2006.01)
*H04N 9/68* (2006.01)
*H04N 9/73* (2006.01)
*H04N 9/77* (2006.01)
*G06T 3/40* (2006.01)
*H04N 101/00* (2006.01)

(52) U.S. Cl.
CPC .............. *H04N 5/772* (2013.01); *H04N 5/907* (2013.01); *H04N 9/045* (2013.01); *H04N 2101/00* (2013.01); *G06T 5/00* (2013.01); *H04N 9/68* (2013.01); *H04N 9/735* (2013.01); *H04N 9/77* (2013.01); *G06T 3/40* (2013.01); *G06T 5/009* (2013.01); *G06T 5/002* (2013.01)

(56) References Cited

U.S. PATENT DOCUMENTS

| | | |
|---|---|---|
| 7,218,418 B2 | 5/2007 | Curry et al. |
| 7,554,583 B2 | 6/2009 | Kuno et al. |
| 7,565,031 B2 * | 7/2009 | Loew ............................ 382/298 |
| 7,719,575 B2 | 5/2010 | Makita et al. |
| 8,200,044 B2 * | 6/2012 | Callway ........................ 382/298 |
| 2001/0030707 A1 | 10/2001 | Fujii |
| 2001/0045923 A1 | 11/2001 | Otobe et al. |
| 2002/0126209 A1 | 9/2002 | Yamada et al. |
| 2003/0063201 A1 | 4/2003 | Hunter et al. |
| 2003/0184659 A1 | 10/2003 | Skow |
| 2004/0076339 A1 * | 4/2004 | Park et al. ..................... 382/275 |
| 2004/0085462 A1 * | 5/2004 | Sasaki ........................ 348/231.6 |
| 2004/0105016 A1 | 6/2004 | Sasaki |
| 2007/0172118 A1 | 7/2007 | Pan |
| 2007/0172119 A1 | 7/2007 | Pan |
| 2008/0043131 A1 | 2/2008 | Tamura et al. |

FOREIGN PATENT DOCUMENTS

| | | |
|---|---|---|
| JP | 2000-236473 | 8/2000 |
| JP | 2003-198836 | 7/2003 |
| JP | 2003-283815 | 10/2003 |
| JP | 2004-40790 | 2/2004 |
| JP | 2005-51394 | 2/2005 |
| JP | 2005-72786 | 3/2005 |
| JP | 2005-328338 | 11/2005 |

OTHER PUBLICATIONS

Japanese Office Action issued on Jan. 21, 2011, in Japanese Application No. 2006-118018 (with partial English translation).

* cited by examiner

FIG. 12

| | | | | | | | | |
|---|---|---|---|---|---|---|---|---|
| V(-8,8) | V(-7,8) | | V(-2,8) | V(-1,8) | V(0,8) | V(1,8) | V(7,8) | V(8,8) |
| x:-2048 y:2047* | x:-1792 y:2047* | | | | | | x:1792 y:2047* | x:2047* y:2047* |
| V(-8,7) | V(-7,7) | | V(-2,7) | V(-1,7) | V(0,7) | V(1,7) | V(7,7) | V(8,7) |
| x:-2048 y:1792 | x:-1792 y:1792 | | | | | | x:1792 y:1792 | x:2047* y:1792 |
| V(-8,6) | V(-7,6) | | V(-2,6) | V(-1,6) | V(0,6) | V(1,6) | V(7,6) | V(8,6) |
| x:-2048 y:1536 | x:-1792 y:1536 | | | | | | x:1792 y:1536 | x:2047* y:1536 |
| V(-8,2) | V(-7,2) | | V(-2,2) | V(-1,2) | V(0,2) | V(1,2) | V(7,2) | V(8,2) |
| | | | x:-512 y:512 | x:-256 y:512 | x:0 y:512 | x:256 y:512 | | |
| V(-8,1) | V(-7,1) | | V(-2,1) | V(-1,1) | V(0,1) | V(1,1) | V(7,1) | V(8,1) |
| | | | x:-512 y:256 | x:-256 y:256 | x:0 y:256 | x:256 y:256 | | |
| V(-8,0) | V(-7,0) | | V(-2,0) | V(-1,0) | V(0,0) | V(1,0) | V(7,0) | V(8,0) |
| | | | x:-512 y:0 | x:-256 y:0 | x:0 y:0 | x:256 y:0 | | |
| V(-8,-1) | V(-7,-1) | | V(-2,-1) | V(-1,-1) | V(0,-1) | V(1,-1) | V(7,-1) | V(8,-1) |
| | | | x:-512 y:-256 | x:-256 y:-256 | x:0 y:-256 | x:256 y:-256 | | |
| V(-8,-2) | V(-7,-2) | | V(-2,-2) | V(-1,-2) | V(0,-2) | V(1,-2) | V(7,-2) | V(8,-2) |
| | | | x:-512 y:-512 | x:-256 y:-512 | x:0 y:-512 | x:256 y:-512 | | |
| V(-8,-6) | V(-7,-6) | | V(-2,-6) | V(-1,-6) | V(0,-6) | V(1,-6) | V(7,-6) | V(8,-6) |
| x:-2048 y:-1536 | x:-1792 y:-1536 | | | | | | x:1792 y:-1536 | x:2047* y:-1536 |
| V(-8,-7) | V(-7,-7) | | V(-2,-7) | V(-1,-7) | V(0,-7) | V(1,-7) | V(7,-7) | V(8,-7) |
| x:-2048 y:-1792 | x:-1792 y:-1792 | | | | | | x:1792 y:-1792 | x:2047* y:-1792 |
| V(-8,-8) | V(-7,-8) | | V(-2,-8) | V(-1,-8) | V(0,-8) | V(1,-8) | V(7,-8) | V(8,-8) |
| x:-2048 y:-2048 | x:-1792 y:-2048 | | | | | | x:1792 y:-2048 | x:2047* y:-2048 |

1step=256digits

F I G . 1 3

F I G . 1 5
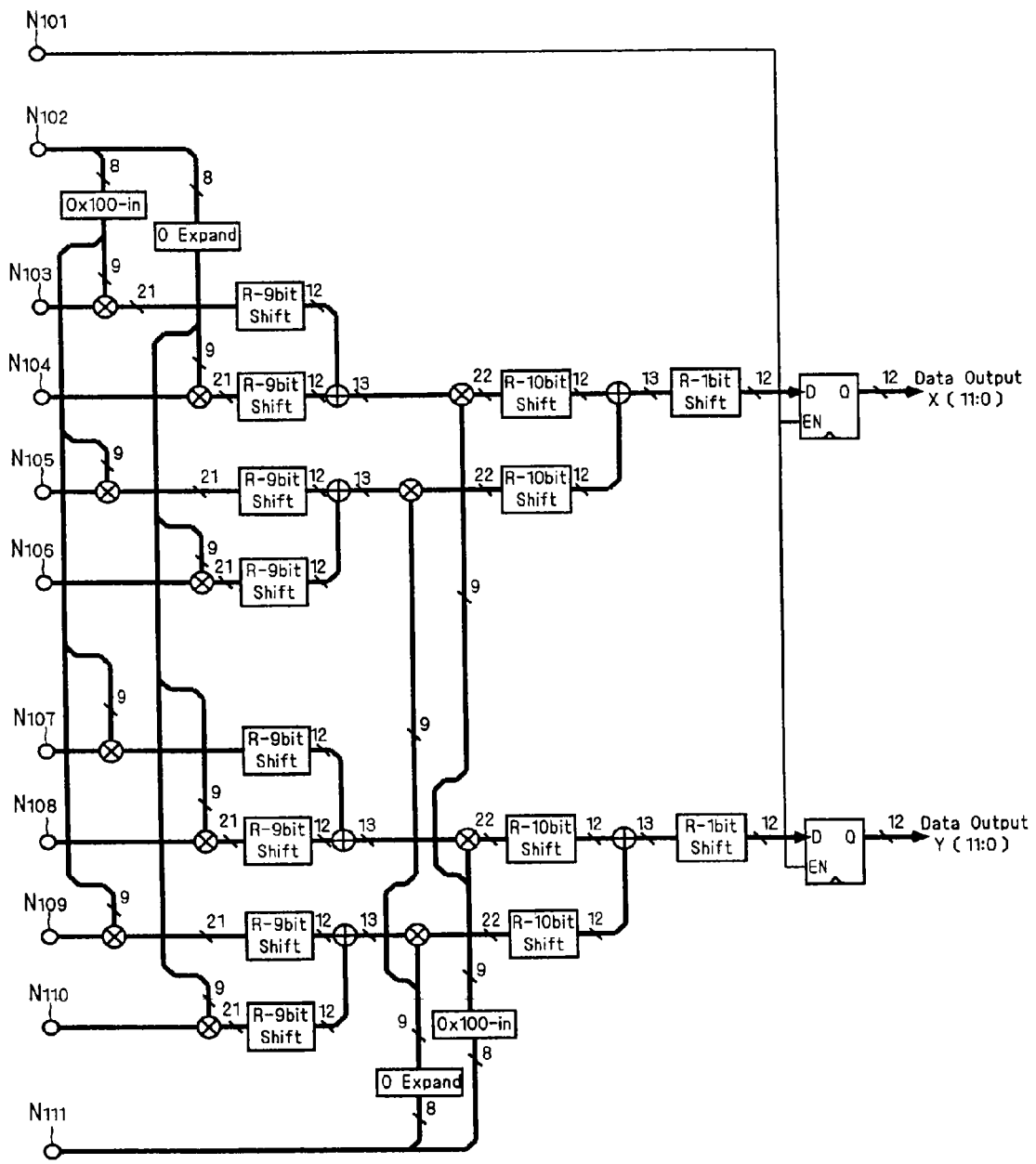

IMAGE PROCESSING APPARATUS HAVING A PLURALITY OF IMAGE PROCESSING BLOCKS THAT ARE CAPABLE OF REAL-TIME PROCESSING OF AN IMAGE SIGNAL

CROSS REFERENCE TO RELATED APPLICATIONS

This application is a divisional application of U.S. application Ser. No. 13/091,838, filed Apr. 21, 2011, which is a divisional application of U.S. application Ser. No. 11/733,958, filed Apr. 11, 2007, which is based on Japanese Patent Application No. 2006-118018, filed Apr. 21, 2006, the entire contents of each of which are incorporated hereinto by reference.

BACKGROUND OF THE INVENTION

1. Field of the Invention

The present invention relates to image processing apparatuses, and particularly to an image processing apparatus having a plurality of image processing blocks that are capable of real-time processing of an image signal inputted from outside.

2. Description of the Background Art

For an image input apparatus such as a digital still camera, Japanese Patent Application Laid-Open No. 2000-236473 discloses a conventional image processing apparatus including an imaging device, an analog signal processing circuit connected to the imaging device, and a Real-time Processing Unit (RPU) connected to the analog signal processing circuit, where the RPU is capable of processing in a real-time manner an image signal outputted from the analog signal processing circuit.

However, this conventional image processing apparatus does not offer sufficient versatility in the following points:
- the number of taps of spatial filter in the spatial filtering block is fixed;
- it is not possible to obtain a high-frequency component when the spatial filter is set not as a high-pass filter;
- it is not possible to obtain a mixture signal, such as a signal containing center pixel signal and low-frequency component at a desired ratio, as an output signal from the spatial filter;
- image quality is considerably deteriorated when a divergence occurs between a pixel as a source of generation of feature data for modulation and a pixel as a target of modulation of luminance signal;
- image quality is considerably deteriorated when a divergence occurs between a pixel as a source of generation of feature data for modulation and a pixel as a target of modulation of color signal;
- no means is provided which is capable of applying high-speed color transformation to 2-channel color signals (Cb, Cr) outputted from the color-space transformation block;
- signals are processed as YCbCr color-space signals after the output of the color-space transformation block, and only a signal of the same color space can be obtained as the final output signal; and
signals are processed as 8-bit-system signals after the output of the gamma correction block, and only a signal of the same number of bits can be obtained as the final output signal.

SUMMARY OF THE INVENTION

An object of the present invention is to obtain an image processing apparatus having higher versatility than conventional image processing apparatuses.

According to a first aspect of the present invention, an image processing apparatus includes a plurality of image processing blocks that are capable of real-time processing of an image signal inputted from outside. The plurality of image processing blocks include a spatial filtering block that applies a spatial filtering to an input signal. The spatial filtering block includes a plurality of spatial filters. When the input signal is a multicolor signal, the plurality of spatial filters perform the spatial filtering in parallel for individual channels corresponding to individual colors, and when the input signal is a monochrome signal, the plurality of spatial filters are connected in series to perform the spatial filtering.

According to this configuration, when the input signal is a monochrome signal, the plurality of spatial filters, connected in series, perform spatial filtering operation. Thus, an extra spatial filter that is originally not related to the processing of monochrome signals can be utilized to achieve filtering operation using spatial filter with a larger number of taps. Also, the total processing time can be shorter than when a filtering operation using the same spatial filter is repeated multiple times.

According to a second aspect of the present invention, an image processing apparatus includes a plurality of image processing blocks that are capable of real-time processing of an image signal inputted from outside. The plurality of image processing blocks include a pixel interpolation block that applies a pixel interpolation to an input signal. The pixel interpolation block includes a pixel register group. When the input signal to the pixel interpolation block is a signal that requires the pixel interpolation, the interpolation is performed, and when the input signal to the pixel interpolation block is a signal that does not require the pixel interpolation, a spatial filtering is performed by a first spatial filter using the pixel register group.

According to this configuration, when the input signal to the pixel interpolation block is a signal that does not require pixel interpolation, a spatial filtering using the pixel resister group is performed. It is thus possible to realize filtering operation using spatial filter with a larger number of taps. Also, the total processing time can be shorter. Furthermore, since the first spatial filter performs spatial filtering using the pixel register group of the pixel interpolation block, the circuit scale can be smaller than when a similar pixel register group is newly provided in the spatial filtering block.

According to a third aspect of the present invention, an image processing apparatus includes a plurality of image processing blocks that are capable of real-time processing of an image signal inputted from outside. The plurality of image processing blocks include a spatial filtering block that applies a spatial filtering to an input signal. The spatial filtering block includes a first low-pass filter, a programmable spatial filter, and a first operator. The first low-pass filter performs a first low-pass filtering. The first operator subtracts a first low-pass filter output signal that is an output signal of the first low-pass filter from a center pixel signal that is an original pixel signal, so as to generate a high-frequency component. The spatial filtering block is capable of simultaneously outputting at least two of the first low-pass filter output signal, an output signal of the programmable spatial filter, and the high-frequency component.

According to this configuration, the first operator subtracts the first low-pass filter output signal from the center pixel signal to generate a high-frequency component. It is thus possible to obtain a high-frequency component similar to a high-pass filter output signal, without using a high-pass filter.

According to a fourth aspect of the present invention, an image processing apparatus includes a plurality of image processing blocks that are capable of real-time processing of an image signal inputted from outside. The plurality of image processing blocks include a spatial filtering block that applies a spatial filtering to an input signal. The spatial filtering block includes a first low-pass filter and a first operator. The first low-pass filter performs a first low-pass filtering. The first operator multiplies together a center pixel signal that is an original pixel signal and a first coefficient, multiplies together a first low-pass filter output signal that is an output signal of the first low-pass filter and a second coefficient, and adds the results of these multiplications together. The sum of the first coefficient and the second coefficient is constant.

According to this configuration, the first operator multiplies together the center pixel signal and a first coefficient, multiplies together the first low-pass filter output signal and a second coefficient, and adds the results of the multiplications together. It is thus possible, by setting the first and second coefficients to desired values, to obtain an output signal in which the center pixel signal and the first low-pass filter output signal are mixed at a desired ratio. The output signal thus obtained can be arbitrarily utilized according to the purpose. It is also possible to keep the direct-current component gain at a constant value because the sum of the first coefficient and the second coefficient is constant.

According to a fifth aspect of the present invention, an image processing apparatus includes a plurality of image processing blocks that are capable of real-time processing of an image signal inputted from outside. The plurality of image processing blocks include a spatial filtering block and a signal modulation block. The spatial filtering block applies a spatial filtering to an input signal. The signal modulation block applies a modulation to an output signal from the spatial filtering block as a signal to be modulated. The spatial filtering block includes a spatial filter that outputs a luminance signal that has been subjected to the spatial filtering. The signal modulation block includes a low-pass filter and an operator. The low-pass filter applies a low-pass filtering to a pixel unit feature signal corresponding to a characteristic of each pixel. The operator modulates the luminance signal by using the pixel unit feature signal that has been subjected to the low-pass filtering.

According to this configuration, the luminance signal is modulated with a pixel unit feature signal that has been low-pass-filtered. Applying the low-pass filtering to the pixel unit feature signal suppresses variations among pixels. This avoids significant variations in the degree of modulation of the luminance signal among pixels. As a result, even if a divergence occurs between a pixel as a source of generation of the pixel unit feature signal and a pixel as a target of the luminance signal modulation, it is possible to lower the degree of image quality deterioration due to divergence in luminance from proper value, than when the pixel unit feature signal is not low-pass-filtered.

According to a sixth aspect of the present invention, an image processing apparatus includes a plurality of image processing blocks that are capable of real-time processing of an image signal inputted from outside. The plurality of image processing blocks include a spatial filtering block and a signal modulation block. The spatial filtering block applies a spatial filtering to an input signal. The signal modulation block applies a modulation to an output signal from the spatial filtering block as a signal to be modulated. The spatial filtering block includes a spatial filter that outputs a color signal that has been subjected to the spatial filtering. The signal modulation block includes a low-pass filter and an operator. The low-pass filter applies a low-pass filtering to a pixel unit feature signal corresponding to a characteristic of each pixel. The operator modulates the color signal by using the pixel unit feature signal that has been subjected to the low-pass filtering.

According to this configuration, the color signal is modulated with a pixel unit feature signal that has been low-pass-filtered. Applying low-pass filtering to the pixel unit feature signal suppresses variations among pixels. This avoids significant variations in the degree of modulation of the color signal among pixels. As a result, even if a divergence occurs between a pixel as a source of generation of the pixel unit feature signal and a pixel as a target of color signal modulation, it is possible to lower the degree of image quality deterioration due to divergence in color from proper value, than when the pixel unit feature signal is not low-pass-filtered.

According to a seventh aspect of the present invention, an image processing apparatus includes a plurality of image processing blocks that are capable of real-time processing of an image signal inputted from outside. The plurality of image processing blocks include a color-space transformation block that applies a color-space transformation to an input signal. The color-space transformation block includes a color-space transformation circuit and a two-dimensional lookup table. The color-space transformation circuit performs the transformation to output 2-channel color signals. The two-dimensional lookup table follows the color-space transformation circuit and transforms the 2-channel color signals on the basis of a plurality of transform values previously defined which represent a correspondence between input data value pairs and output data value pairs.

According to this configuration, the two-dimensional lookup table is connected to follow the color-space transformation circuit that outputs two-channel color signals. The color-space transformation block performs color-space transformation by real-time processing. When the color-space transformation is performed using a three-dimensional lookup table that involves large amounts of calculations, the processing in the three-dimensional lookup table forms a bottleneck to delay the entire processing. Also, a three-dimensional lookup table involves a very large circuit scale. In contrast, using a two-dimensional lookup table avoids increased circuit scale and achieves high-speed color-space transformation without delaying the entire processing.

According to an eighth aspect of the present invention, an image processing apparatus includes a plurality of image processing blocks that are capable of real-time processing of an image signal inputted from outside. The plurality of image processing blocks include a first color-space transformation block, a processing block, and a second color-space transformation block. The first color-space transformation block transforms a signal of a first color space to a signal of a second color space including a luminance component and a plurality of color components. The processing block applies predetermined image processing to the signal of the second color space outputted from the first color-space transformation block. The second color-space transformation block transforms the signal of the second color space outputted from the processing block into a signal of a color space that is different from the second color space.

According to this configuration, the second color-space transformation block transforms a signal of the second color space outputted from the processing block into a signal of a color space that is different from the second color space. Thus, the processing block performs various operations using signals of the second color space, and then the second color-space transformation block transforms the color space. It is thus possible to finally obtain an output signal of the first color space, for example.

According to a ninth aspect of the present invention, an image processing apparatus includes a plurality of image processing blocks that are capable of real-time processing of an image signal inputted from outside. The plurality of image processing blocks include a resizing block that applies an image resizing to an input signal. The resizing block includes a first resizing circuit and a second resizing circuit. The first resizing circuit is capable of processing a signal with a first number of bits. The second resizing circuit is capable of processing a signal with a second number of bits that is smaller than the first number of bits. When the input signal is of the first number of bits, the resizing block performs the resizing by using the first resizing circuit, and when the input signal is of the second number of bits, the resizing block performs the resizing by using the second resizing circuit.

According to this configuration, 12-bit-system signals for main images and 8-bit-system signals for display or for thumbnail images, for example, are inputted as input signals to the resizing block. Then, it is possible to select which resizing circuit should be used according to the number of bits of the input signal, from among a plurality of resizing circuits configured to process signals of different numbers of bits. Furthermore, the circuit scale can be smaller than when the plurality of resizing circuits are all provided as resizing circuits capable of processing signals of the first number of bits.

These and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a diagram showing an example of setting of transform values in a two-dimensional lookup table;

FIG. 13 is a diagram showing another example of the two-dimensional lookup table;

FIGS. 14 and 15 are circuit diagrams showing a first example of specific configuration of the two-dimensional lookup table.

DESCRIPTION OF THE PREFERRED EMBODIMENTS

Figure 1:
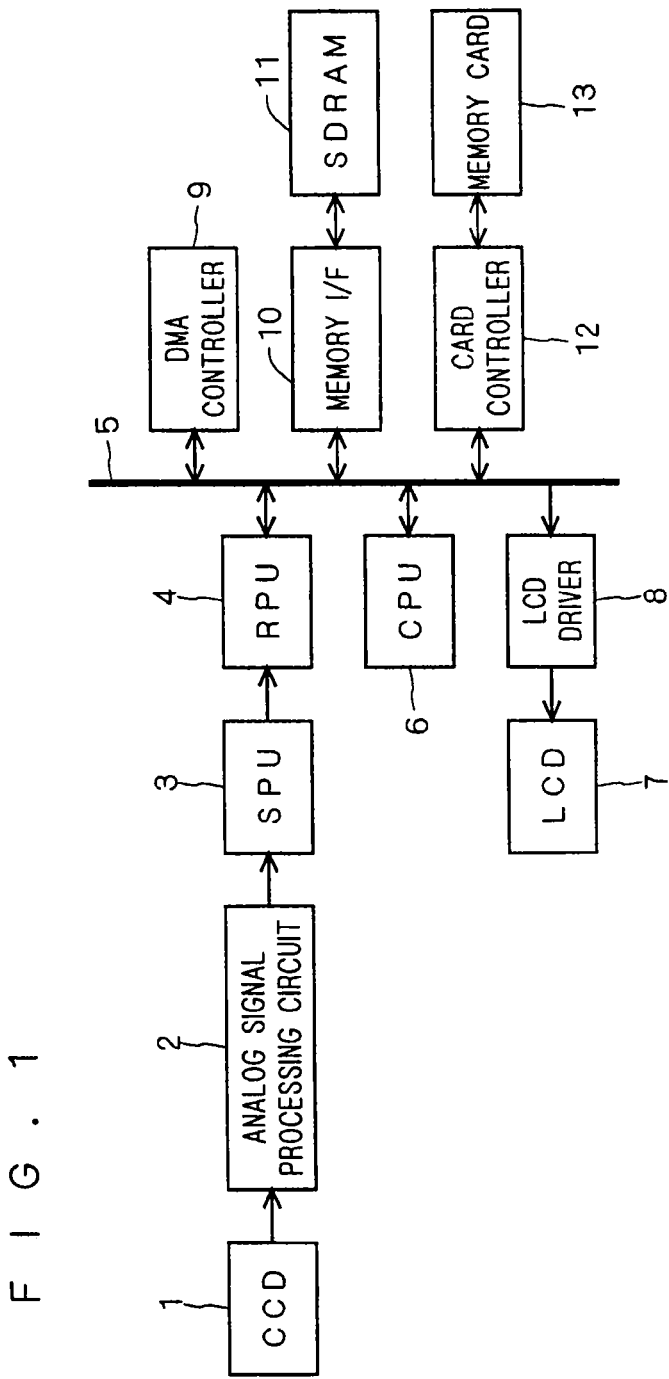
FIG. 1 is a block diagram schematically illustrating the entire configuration of a digital still camera according to a preferred embodiment of the present invention.

A preferred embodiment of the present invention will now be described in detail referring to the drawings. In the drawings, the same reference characters indicate the same or corresponding components.

FIG. 1 is a block diagram schematically illustrating the entire configuration of a digital still camera according to a preferred embodiment of the present invention. A CCD 1 is followed by an analog signal processing circuit 2. The analog signal processing circuit 2 is followed by an SPU (Sensor Processing Unit) 3. The SPU 3 is followed by an RPU (Real-time Processing Unit) 4. The RPU 4 is connected to a main bus 5. As well as the RPU 4, a CPU 6, an LCD driver 8, a DMA controller 9, a memory interface 10, and a card controller 12 are also connected to the main bus 5. An LCD 7 is connected to the LCD driver 8, an SDRAM 11 is connected to the memory interface 10, and a memory card 13 is connected to the card controller 12.

The CCD 1 has a three-color-system color filter for, e.g., R (Red), G (Green) and B (Blue), or a four-color-system color filter for, e.g., Y (yellow), M (Magenta), C (Cyan), and W (White), and it pictures an image with an optical lens and outputs the image signal thus obtained. Other type of imaging device, such as a CMOS image sensor, may be used in place of the CCD 1.

The analog signal processing circuit 2 receives the analog image signal from the CCD 1, and applies signal processings to the analog image signal, such as noise reduction, signal amplification, A/D conversion, etc., so as to output a digital image signal.

The SPU 3 receives the image signal from the analog signal processing circuit 2, and applies thereto various signal processings related to problems due to image sensor characteristics, such as white balance control.

The RPU 4 receives the image signal from the SPU 3, or an image signal from the SDRAM 11 through the main bus 5, and applies various signal processings thereto, such as pixel interpolation, color-space transformation, false color suppression, etc. (which will be fully described later).

The CPU 6 generally controls the operations of the components shown in FIG. 1. However, the transmission of image signals through the main bus 5 is controlled by the DMA controller 9, whereby the load on the CPU 6 is reduced.

The LCD 7 functions as a finder of the digital still camera. The LCD 7 displays a low-resolution image represented by, e.g., an 8-bit-system image signal. The term "8-bit system" means eight bits with no sign or nine bits with a sign. Hereinafter, "n-bit system" means n bits with no sign or n+1 bits with a sign. The display of images in the LCD 7 is controlled by the LCD driver 8.

When a user presses an image-taking button (not shown), a high-resolution image (main image) represented by, e.g., a 12-bit-system image signal, is recorded in the memory card 13. The resolution of the main image can be selected by the user. The recording of images in the memory card 13 is controlled by the card controller 12.

Figure 2:
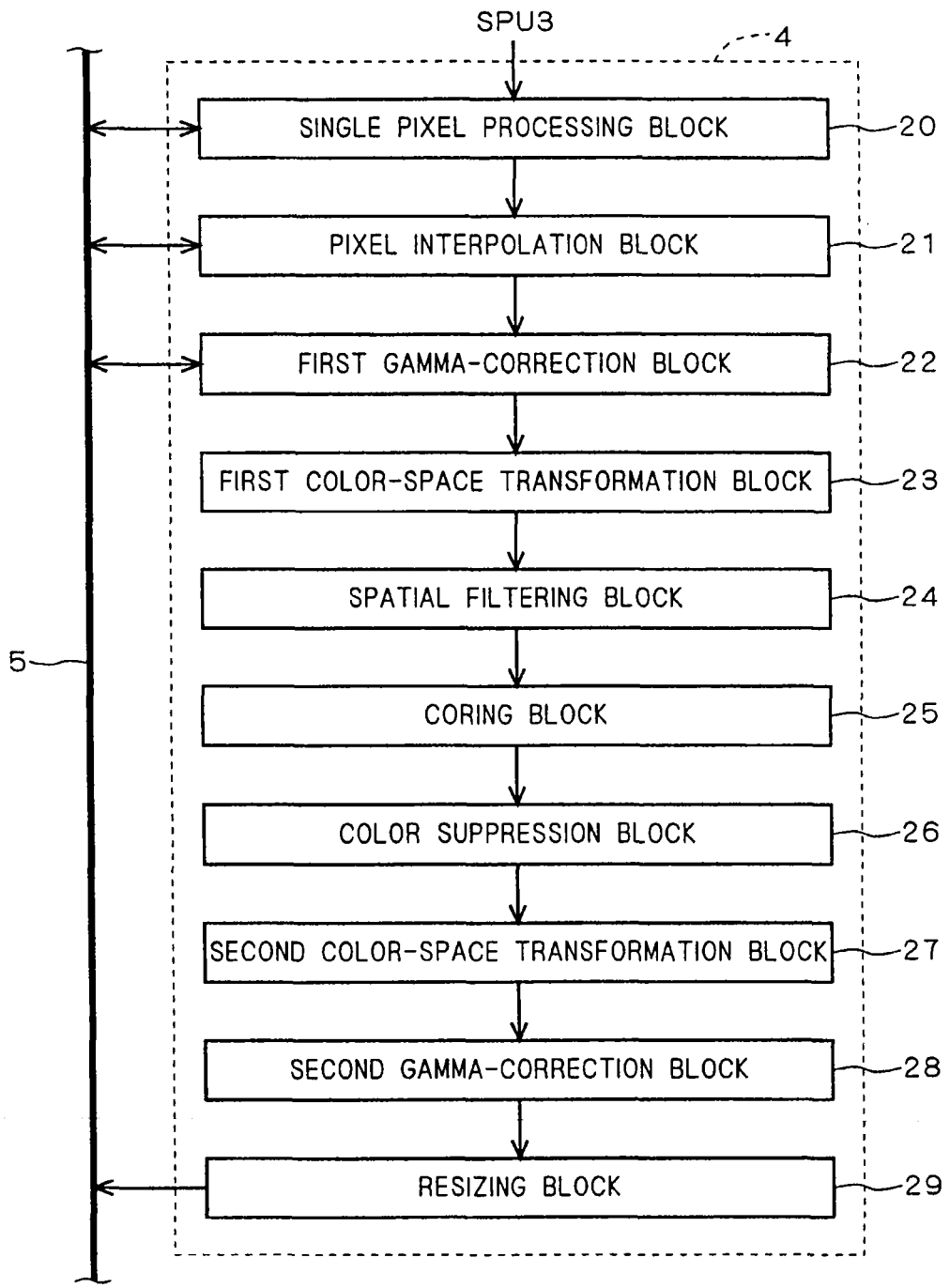
FIG. 2 is a block diagram schematically illustrating the functional configuration of an RPU.

FIG. 2 is a block diagram schematically illustrating the functional configuration of the RPU 4. The RPU 4 includes a single pixel processing block 20, a pixel interpolation block 21, a first gamma-correction block 22, a first color-space transformation block 23, a spatial filtering block 24, a coring block 25, a color suppression block (signal modulation block) 26, a second color-space transformation block 27, a second gamma-correction block 28, and a resizing block 29.

The RPU 4 is capable of processing an image signal directly inputted from the SPU 3 (real-time processing) and an image signal once stored in the SDRAM 11 from the SPU 3 and then transferred from the SDRAM 11 through the main bus 5 (post processing).

In real-time processing, all processing blocks 20 to 29 operate on the basis of a given pixel clock synchronized with a read clock for reading pixel signals from the CCD 1. That is, the processing blocks 20 to 29 receive input image signals from the preceding processing blocks according to the pixel clock, and process the input image signals according to the pixel clock. All processing blocks 20 to 29 are capable of operating in parallel according to the pixel clock, and so the RPU 4 is constructed as a pipeline image processing device. In post processing, a pixel clock for the RPU 4 may be set independently of the read clock for the CCD 1.

An image signal inputted to the single pixel processing block 20 from the SPU 3 or the SDRAM 11 is sequentially processed in the processing blocks 20 to 29, and then transferred from the resizing block 29 to the SDRAM 11 through the main bus 5. It is also possible to bypass arbitrary one or ones of the processing blocks 20 to 29.

The single pixel processing block 20, the pixel interpolation block 21, and the first gamma-correction block 22 have inputs and outputs connected to the main bus 5. Accordingly, it is possible to input an image signal to each of the processing blocks 20 to 22 from the SDRAM 11 through the main bus 5, and to transfer the image signal, processed in the processing blocks 20 to 22, to the SDRAM 11 through the main bus 5. For example, it is possible to input an image signal from the SDRAM 11 to the first gamma-correction block 22 and transfer the image signal, processed in the first gamma-correction block 22, to the SDRAM 11 from the first gamma-correction block 22.

FIGS. 3 to 11 are circuit diagrams illustrating a specific configuration of the RPU 4. These diagrams are connected together at the connection points $N_{O01}$ to $N_{O70}$ Of the same numbers. Now, referring to FIGS. 3 to 11, the specific configurations of the processing blocks 20 to 29 shown in FIG. 2, particularly characteristic portions related to the present invention, will be sequentially described below.

Figure 11:
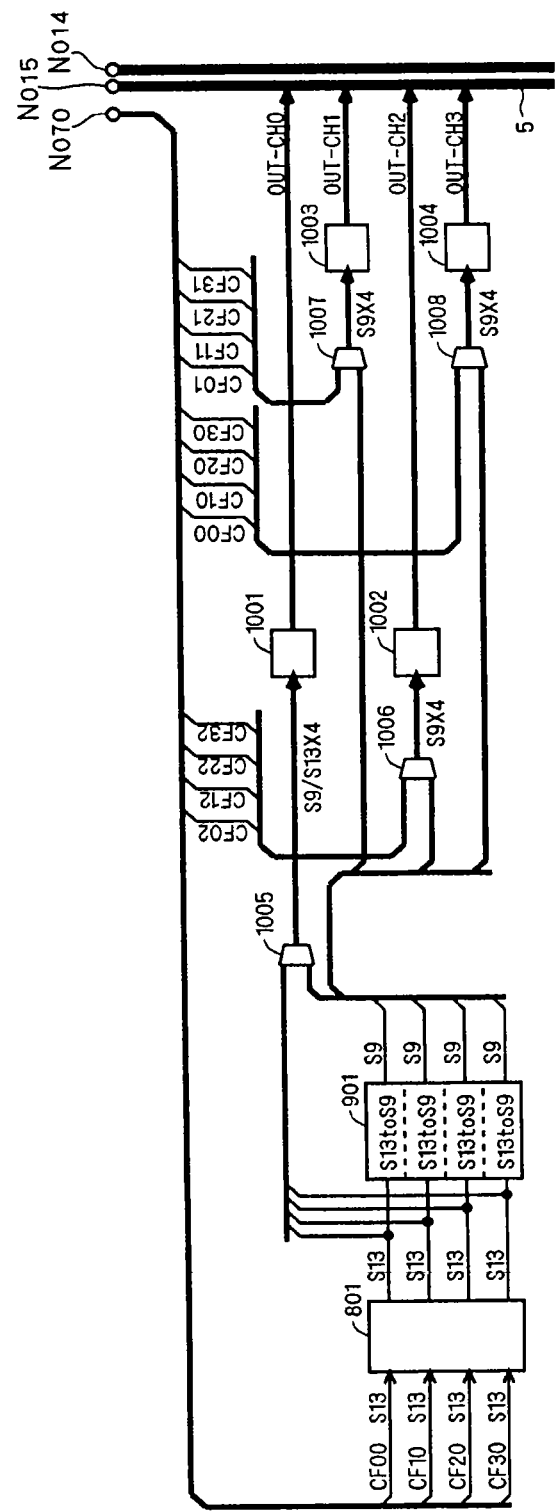

The RPU 4 has 4-channel input DMA channels IN-CH0 to IN-CH3 (see FIG. 3, for example), and 4-channel output DMA channels OUT-CH0 to OUT-CH3 (see FIG. 11, for example). Each DMA channel has 4-channel, color channels C0 to C3.

In the notation of the numbers of bits of image signals, "S" and "U" preceding the numbers of bits represent "with a sign" and "with no sign", respectively. For example, "S17" means 17 bits with a sign, and "U8" means 8 bits with no sign. Also, in the diagrams, a reduction of the number of bits indicates "clipping" of omitting low-order bits after a multiplier, or omitting high-order bits after an adder or a shifter, unless otherwise stated.

Single Pixel Processing Block 20

Figure 3:
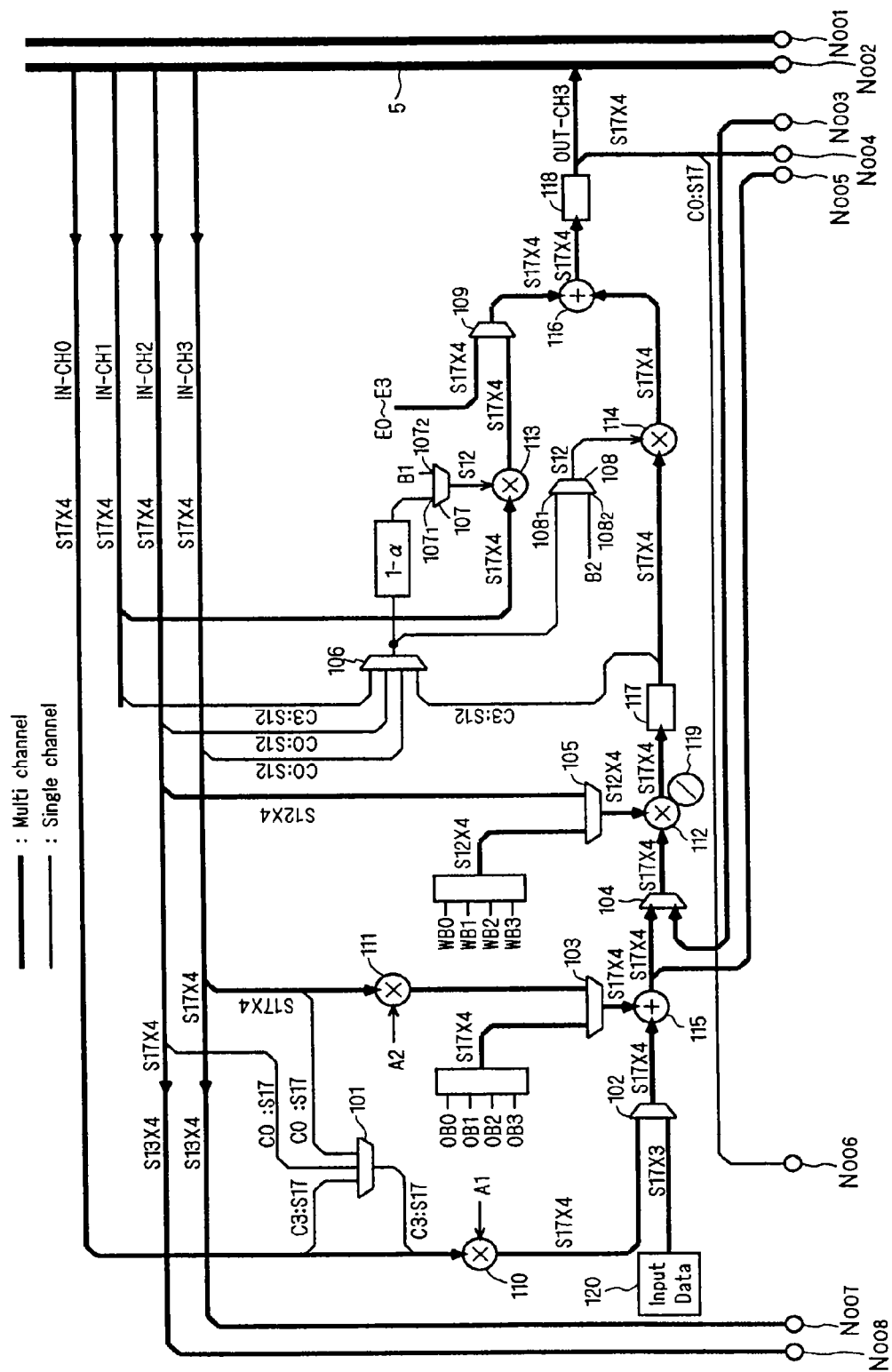
FIGS. 3 to 11 are circuit diagrams illustrating a specific configuration of the RPU.

The configuration of the single pixel processing block 20 is illustrated in FIG. 3. As shown in FIG. 3, the single pixel processing block 20 includes selectors 101 to 109, multipliers 110 to 114, adders 115 and 116, shifters/limiters 117, 118, and a divider 119. The reference characters A1, A2, B1, B2 are coefficients, E0 to E3 are offset coefficients for individual color channels C0 to C3, OB0 to OB3 are coefficients for optical black correction for individual DMA channels CH0 to CH3, and WB0 to WB3 are coefficients for white balance correction for individual DMA channels CH0 to CH3.

The single pixel processing block 20 has a function of processing, pixel by pixel, an image signal (Input Data) 120 inputted from the SPU 3, and an image signal inputted from the SDRAM 11 through the main bus 5, and it is capable of selectively performing temporal averaging, shading correction, etc.

The temporal averaging is a process of averaging an image signal inputted to the RPU 4 over a plurality of frames or a plurality of fields, while reading pixel signals from the CCD 1 according to the read clock. The scheme of addition of pixel signals for averaging can be selected from cumulative addition and circulating addition, according to the settings of the selectors 107 and 108 and the coefficients B1 and B2. Cumulative addition is performed when the selector 107 selects its input terminal $107_2$, the selector 108 selects its input terminal $108_2$, and the coefficients B1 and B2 are both set to "1". On the other hand, circulating addition is performed when the selector 107 selects its input terminal $107_1$, the selector 108 selects its input terminal $108_2$, and the coefficient B2 is set to "∀".

Also, the shading correction can be performed when the selector 107 selects its input terminal $107_2$, the selector 108 selects its input terminal $108_1$, and the coefficient B1 is set to "0". In this case, a given shading correction parameter is inputted to the input terminal $108_1$ of the selector 108 from the SDRAM 11 through the main bus 5 and the selector 106.

Pixel Interpolation Block 21

Figure 4:
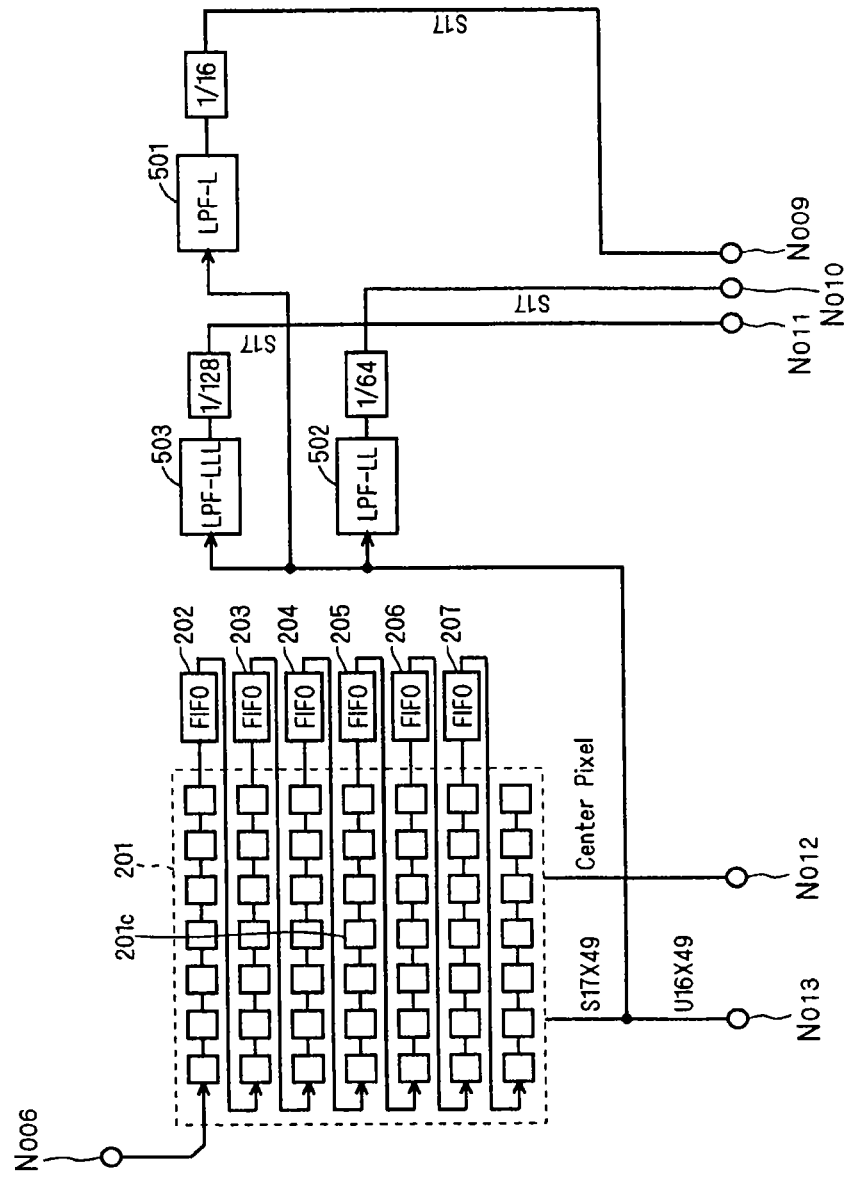
Figure 5:
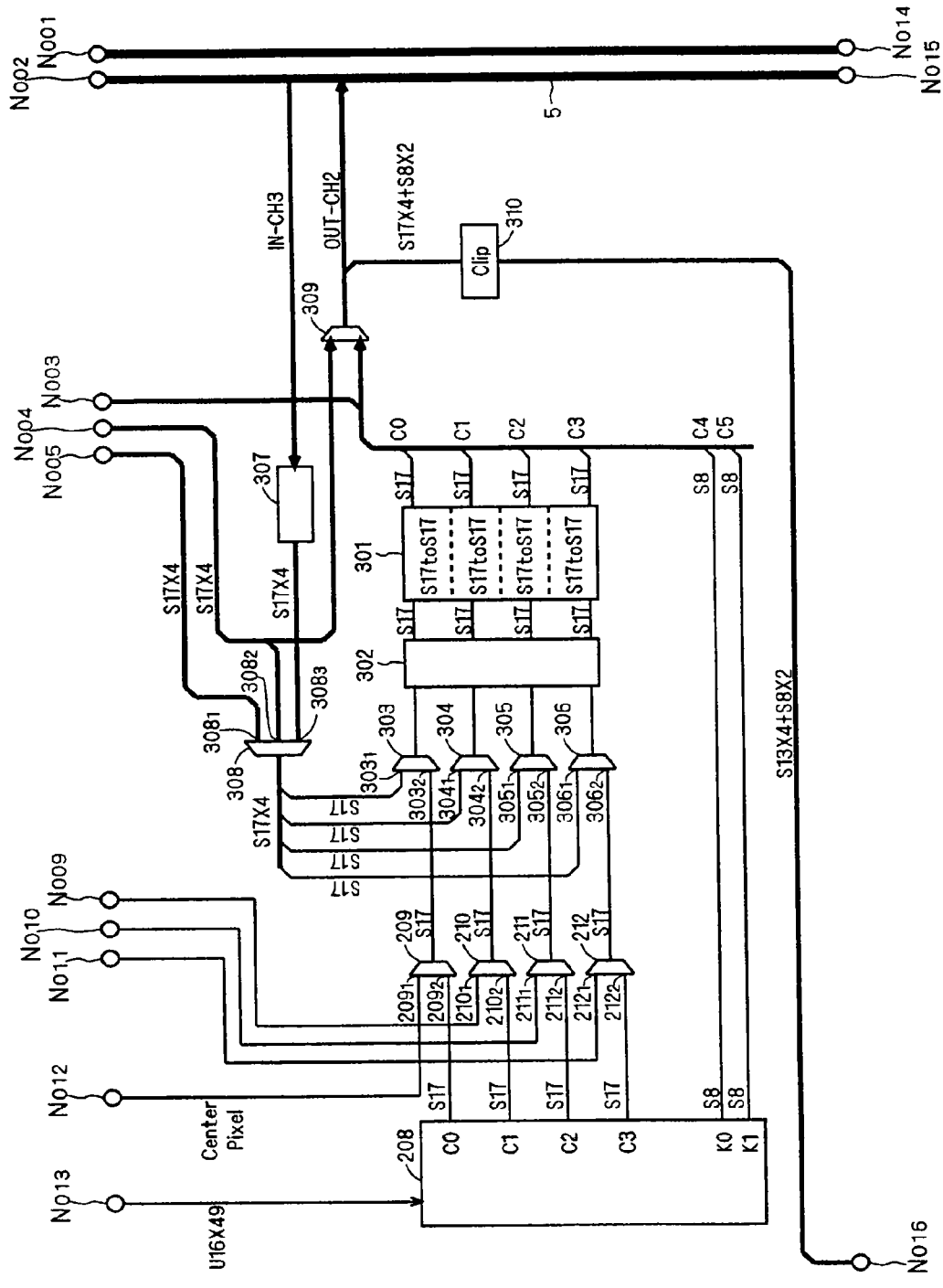

The configuration of the pixel interpolation block 21 is illustrated in FIGS. 4 and 5. As shown in FIGS. 4 and 5, the pixel interpolation block 21 includes a pixel register group 201, line buffers (FIFOs) 202 to 207, and an interpolation operation unit 208. The pixel register group 201 is formed of a total of 49 pixel registers of 7H7 taps around a pixel register 201c in which the pixel signal of a target pixel is stored. The line buffers 202 to 207 are connected between the rows of the pixel register group 201. For example, the line buffer 202 is connected between the first and second rows of the pixel register group 201.

The interpolation operation unit 208 receives the 49 pixel signals stored in the pixel registers of the pixel register group 201. On the basis of the input pixel signals, the interpolation operation unit 208 interpolates a color component absent for the target pixel, by referring to the pixel signals around the target pixel. For example, when the target pixel is a pixel having R component in the RGB color space, the absent G and B components are generated by interpolation. Then, the color channel C0 output terminal of the interpolation operation unit 208 outputs R-component pixel signal, the color channel C1 output terminal outputs G-component pixel signal, and the color channel C2 output terminal outputs B-component pixel signal. The color channel C3 output terminal outputs, as needed, a KEY signal for particularly featuring each pixel. When the input signal to the RPU 4 is a 4-color-system signal of Y, M, C, W, then the color channel C0 output terminal outputs Y-component pixel signal, the color channel C1 output terminal outputs M-component pixel signal, the color channel C2 output terminal outputs C-component pixel signal, and the color channel C3 output terminal outputs W-component pixel signal.

The interpolation operation unit 208 also has a function of determining the degree of correlation between target and surrounding pixels using an arbitrary correlation determining scheme (e.g., vertical/horizontal correlation determination) on the basis of the pixel signals inputted from the pixel register group 201, and the resultant correlation signal is outputted from the channel K0 (channel C4) or channel K1 (channel C5) output terminal.

The interpolation operation unit 208 also has a function of detecting color level (chroma, saturation) of a target pixel on the basis of the pixel signals inputted from the pixel register group 201, and the resultant color level signal is outputted from the channel K0 or channel K1 output terminal.

Also, the interpolation operation unit 208 has a function of performing Sobel filtering for edge detection on the basis of the pixel signals inputted from the pixel register group 201, and the resultant Sobel filter output signal is outputted from the channel K0 or channel K1 output terminal.

These correlation signal, color level signal, and Sobel filter output signal represent features of each pixel, and they can be regarded as "pixel unit feature signals" corresponding to characteristics of each pixel. It is possible to arbitrarily select which of the correlation signal, color level signal, and Sobel filter output signal should be outputted from the channels K0 and K1. It is also possible to output one of the pixel unit feature signals as the above-mentioned KEY signal from the color channel C3 output terminal.

First Gamma-Correction Block 22

The configuration of the first gamma-correction block 22 is illustrating in FIG. 5. As shown in FIG. 5, the first gamma-correction block 22 includes a gamma correction unit 301. The gamma correction unit 301 is capable of performing conversion from 16-bit system to 16-bit system using, e.g. lookup tables, independently for individual color channels C0 to C3.

The gamma correction unit 301 is preceded by a linear matrix converter 302. The linear matrix converter 302 performs color corrections in linear region, such as correction of difference from ideal characteristics of the color filter of the CCD 1.

When selectors 209 to 212 respectively select their input terminals $209_2$ to $212_2$ and selectors 303 to 306 respectively select their input terminals $303_2$ to $306_2$, the output signals from the interpolation operation unit 208 can be inputted to the gamma correction unit 301. When the selectors 303 to 306 respectively select their input terminals $303_1$ to $306_1$ and a selector 308 selects its input terminal $308_1$, an output signal from the SPU 3 can be inputted to the gamma correction unit 301. When the selectors 303 to 306 respectively select their input terminals $303_1$ to $306_1$ and the selector 308 selects its input terminal $308_2$, an output signal from the shifter/limiter 118 of the single pixel processing block 20 can be inputted to the gamma correction unit 301. Also, when the selectors 303 to 306 respectively select their input terminals $303_1$ to $306_1$ and the selector 308 selects its input terminal $308_3$, an image signal read from the SDRAM 11 can be inputted to the gamma correction unit 301 through a color sampling module 307.

The output signals from the gamma correction unit 301 are inputted to a clipping circuit 310 through a selector 309, clipped in the clipping circuit 310 to 12-bit-system image signals, and then inputted to the following first color-space transformation block 23. The output signals from the gamma correction unit 301 can also be inputted to the SDRAM 11 through the selector 309 and the main bus 5. Pixel unit feature signals outputted from the channels K0, K1 of the interpolation operation unit 208 are inputted to the following first color-space transformation block 23 through the selector 309 and the clipping circuit 310.

First Color-Space Transformation Block 23

Figure 6:
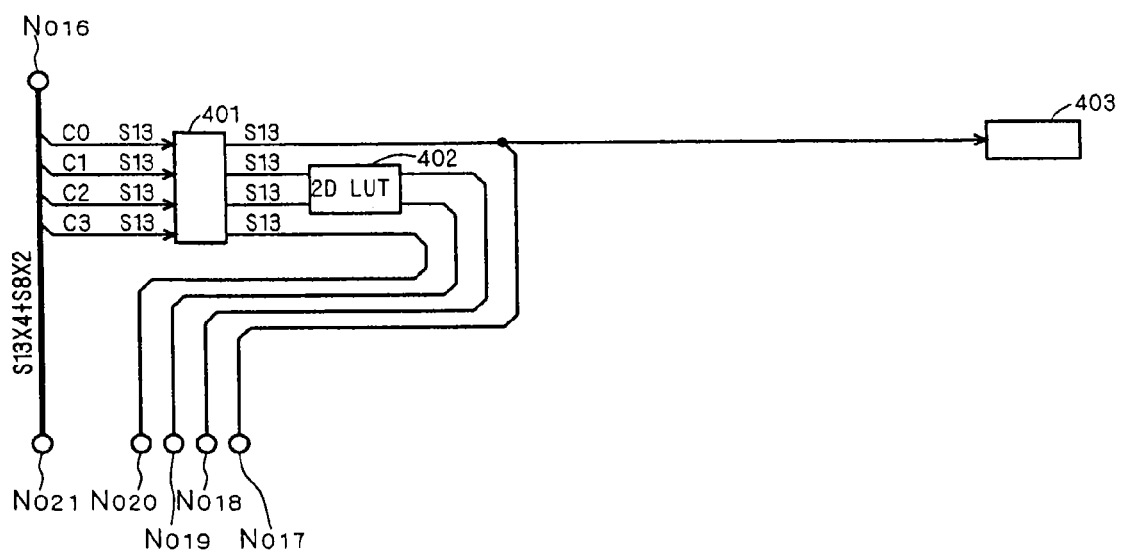

The configuration of the first color-space transformation block 23 is illustrated in FIG. 6. As shown in FIG. 6, the first color-space transformation block 23 includes a color-space transformation circuit 401 and a two-dimensional lookup table 402.

The color-space transformation circuit 401 is capable of performing matrix operation with 4-channel inputs and 4-channel outputs, which, for example, transforms an RGB color-space or YMCW color-space image signal into the YCbCr color space (YUV color space) and outputs the image signal. The color channel C0 output terminal of the color-space transformation circuit 401 outputs Y-component pixel signal, the color channel C1 output terminal outputs Cb-component pixel signal, and the color channel C2 output terminal outputs Cr-component pixel signal. The color channel C3 output terminal outputs a KEY signal as needed.

The two-dimensional lookup table 402 is connected to the output terminals of the color channels C1 and C2 of the color-space transformation circuit 401, and it transforms the values of the Cb-component and Cr-component pixel signals to desired values, on the basis of a plurality of transform values representing a correspondence between pairs of input data values (Cb, Cr) and pairs of output data values (Cb, Cr). The two-dimensional lookup table 402 will be described in detail later.

An exposure determining evaluator 403 is connected to the color channel C0 output terminal of the color-space transformation circuit 401. For preconditions to determine shutter speed and diaphragm stop, the exposure determining evaluator 403 determines exposure level on the basis of proper luminance of the actual image signal. It divides one frame of image into a plurality of blocks and performs a luminance evaluation to level the luminances of the blocks.

Spatial Filtering Block 24

Figure 7:
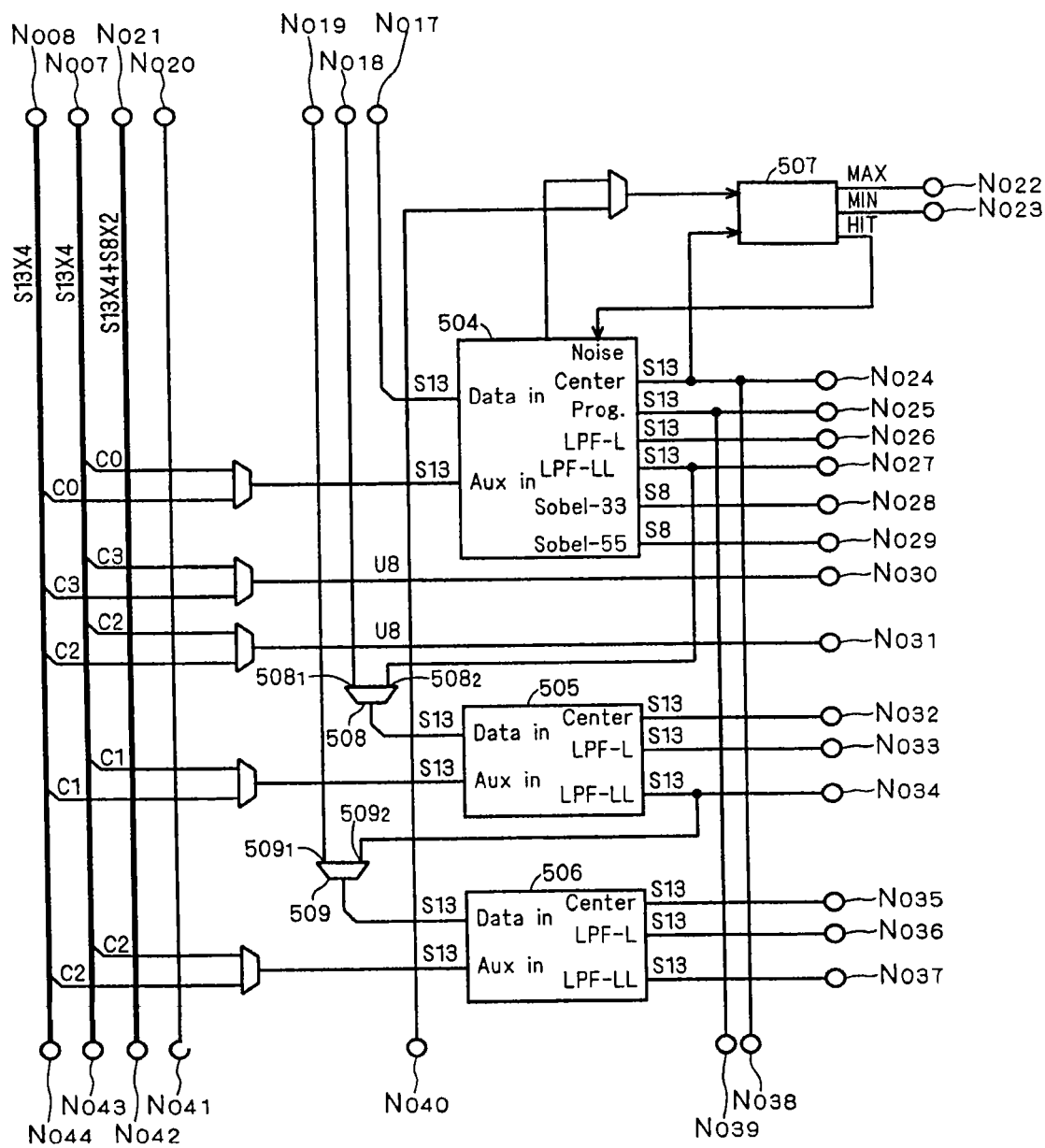
Figure 8:
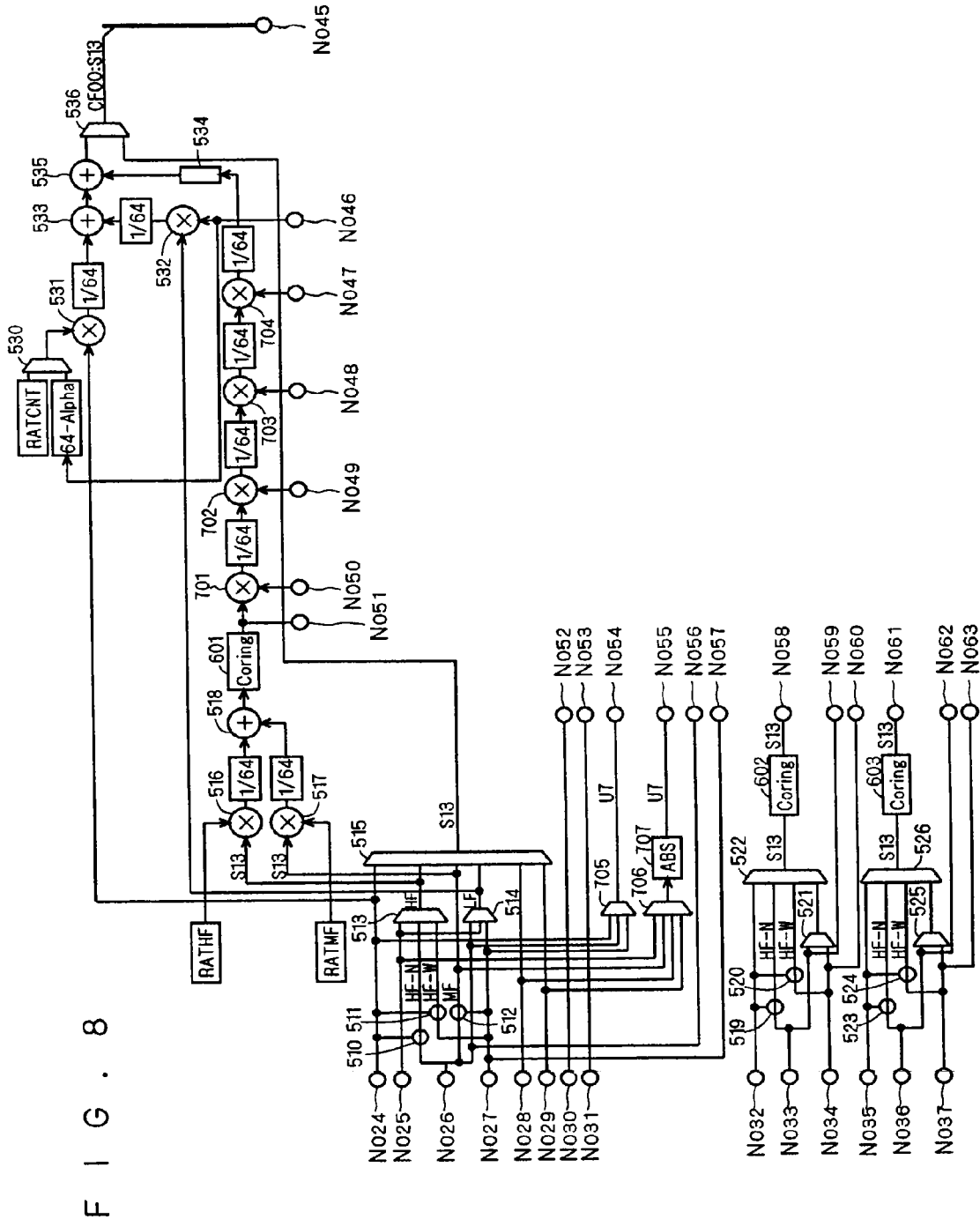

The configuration of the spatial filtering block 24 is illustrated in FIGS. 4, 7 and 8. As shown in FIG. 4, the spatial filtering block 24 includes a 3H3-tap fixed low-pass filter 501 (LPF-L), a 5H5-tap fixed low-pass filter 502 (LPF-LL), a 7H7-tap fixed low-pass filter 503 (LPF-LLL), and, as shown in FIG. 7, a 5H5-tap programmable spatial filter 504 corresponding to the color channel C0, a 5H5-tap spatial filter 505 corresponding to the color channel C1, and a 5H5-tap spatial filter 506 corresponding to the color channel C2. While FIG. 4 does not show the settings of filter coefficients of the fixed low-pass filters 501 to 503, the total value of filter coefficients is "16" for the fixed low-pass filter 501, "64" for the fixed low-pass filter 502, and "128" for the fixed low-pass filter 503.

Referring to FIG. 4, the fixed low-pass filters 501 to 503 perform low-pass filtering on the basis of the pixel signals inputted from the pixel register group 201. Referring to FIGS. 4 and 5, when the selectors 209 to 212 respectively select their input terminals $209_1$ to $212_1$ and the selectors 303 to 306 respectively select their input terminals $303_2$ to $306_2$, the center pixel signal as an original pixel signal stored in the pixel register 201c and the output signals from the fixed low-pass filters 501 to 503 are inputted to the gamma correction unit 301. These signals outputted from the gamma correction unit 301 are clipped in the clipping circuit 310 to 12-bit-system signals, and they can be inputted to the programmable spatial filter 504 and the spatial filters 505 and 506 shown in FIG. 7 through the color-space transformation circuit 401 and the two-dimensional lookup table 402 shown in FIG. 6.

Referring to FIG. 7, the programmable spatial filter 504 is capable of outputting a center pixel signal (center), a programmable filter output signal (Prog.), a low-pass filter output signal (LPF-L) from 3H3-tap fixed low-pass filter, a low-pass filter output signal (LPF-LL) from 5H5-tap fixed low-pass filter, a 3H3-tap Sobel filter output signal (Sobel-33), and a 5H5-tap Sobel filter output signal (Sobel-55). The programmable spatial filter 504 is normally set as high-pass filter, and the programmable filter output signal (Prog.) is normally a high-pass filter output signal.

The spatial filters 505 and 506 are each capable of outputting a center pixel signal (center), a low-pass filter output signal (LPF-L) from 3H3-tap fixed low-pass filter, and a low-pass filter output signal (LPF-LL) from 5H5-tap fixed low-pass filter.

When the input signal to the spatial filtering block 24 is a color image signal (in this example, a YCbCr color-space signal), a selector 508 selects its input terminal $508_1$ and a selector 509 selects its input terminal $509_1$. In this case, the Y-component image signal is inputted to the programmable spatial filter 504, the Cb-component image signal is inputted to the spatial filter 505, and the Cr-component image signal is inputted to the spatial filter 506. Then, the programmable spatial filter 504 and the spatial filters 505 and 506 perform spatial filtering operations in parallel.

On the other hand, when the input signal to the spatial filtering block 24 is a monochrome image signal including Y component only, the selector 508 selects its input terminal $508_2$ and the selector 509 selects its input terminal $509_2$. Then, the low-pass filter output signal (LPF-LL) of the programmable spatial filter 504 is inputted to the spatial filter 505, and the low-pass filter output signal (LPF-LL) of the spatial filter 505 is inputted to the spatial filter 506. That is, the programmable spatial filter 504 and the spatial filters 505 and 506 are connected in series (in cascade), and the cascade-connected, three spatial filters perform filtering operation. In this example, 5H5-tap low-pass filters are cascade-connected in three stages, enabling low-pass filtering with 13H13 taps.

In this way, when the input signal is a monochrome signal, the filtering operation is performed by the cascade-connected multiple spatial filters 504 to 506. The spatial filters 505 and 506 that are originally not related to the processing of monochrome signals can thus be utilized to enable filtering operation using spatial filter with a larger number of taps. Also, the processing can be done through a single pass, and so the total processing time can be shorter than when the filtering operation using the spatial filter 504 is repeated through a plurality of passes. Furthermore, because the cascade-connected spatial filters 504 to 506 are all low-pass filters, the filter coefficient distribution of the low-pass filters can be maintained even though a plurality of spatial filters are cascade-connected, and the function as low-pass filter is not damaged.

Also, with a monochrome image signal which does not need the pixel interpolation in the pixel interpolation block 21, the selectors 209 to 212 shown in FIG. 5 can respectively select the input terminals $209_1$ to $212_1$. Accordingly, for example, the output signal from the 5H5-tap fixed low-pass filter 502 shown in FIG. 4 can be inputted to the programmable spatial filter 504 shown in FIG. 7. That is, the spatial filter using the pixel register group 201 shown in FIG. 4 and the spatial filters 504 to 506 shown in FIG. 7 are continuously applied to perform spatial filtering. In this example, 5H5-tap low-pass filters are cascade-connected in four stages, enabling 17H17-tap low-pass filtering.

Thus, when the input signal to the pixel interpolation block 21 does not require pixel interpolation, a spatial filtering operation with an increased number of taps can be realized by using the fixed low-pass filter 502 and the spatial filters 504 to 506. Also, the processing can be done through a single pass, and so the total processing time can be shorter than when the filtering operation using the spatial filter 504 is repeated through a plurality of passes. Furthermore, since the fixed low-pass filters 501 to 503 perform filtering by using the pixel register group 201 in the pixel interpolation block 21, the circuit scale can be smaller than when a similar pixel register group is newly provided in the spatial filtering block 24. Moreover, because the cascade-connected spatial filters 502, 504 to 506 are all low-pass filters, the filter coefficient distribution of the low-pass filters can be maintained even though a plurality of spatial filters are cascade-connected, and the function as low-pass filter is not damaged.

Referring to FIG. 7, a noise reduction circuit 507 is connected to the programmable spatial filter 504. The noise reduction circuit 507 receives the center pixel signal and pixel signals of a pixel register group (not shown) from the programmable spatial filter 504. Then, it compares the maximum and minimum values of the pixel signals of the pixel register group and the value of the center pixel signal, and when the value of the center pixel signal coincides with the maximum value or the minimum value, it recognizes the center pixel signal as noise. In this case, a new center pixel signal is generated by interpolation using surrounding pixel signals.

On the other hand, when the value of the center pixel signal does not coincide with the maximum value nor the minimum value, that center pixel signal is recognized not as noise, and no new center pixel signal is generated.

Next, referring to FIG. 8, the spatial filtering block 24 includes subtracters 510 to 512, 519, 520, 523, 524, multipliers 516, 517, 531, 532, adders 518, 533, 535, selectors 513 to 515, 521, 522, 525, 526, 530, 536, and a limiter 534.

The subtracter 510 subtracts the 3H3-tap low-pass filter output signal from the center pixel signal of the programmable spatial filter 504, so as to generate a relatively narrow-band, high-frequency component (HF-N). The subtracter 511 subtracts the 5H5-tap low-pass filter output signal from the center pixel signal of the programmable spatial filter 504, so as to generate a relatively wide-band, high-frequency component (HF-W). Accordingly, high-frequency components similar to a high-pass filter output signal can be obtained even when the programmable spatial filter 504 is set not as a high-pass filter.

The subtracter 512 subtracts the 5H5-tap low-pass filter output signal from the 3H3-tap low-pass filter output signal of the programmable spatial filter 504, so as to generate a medium-frequency component (MF). It is thus possible to generate a medium-frequency component similar to a band-pass filter output signal without using a band-pass filter that passes medium-frequency component. The medium-frequency component thus obtained can be arbitrarily utilized according to the purpose of the user, whereby the versatility can be enhanced.

The selector 513 selects and outputs one of the high-pass filter output signal of the programmable spatial filter 504, the output signal from the subtracter 510, and the output signal from the subtracter 511. The selector 514 selects and outputs one of an output signal from the programmable spatial filter 504 (particularly, the output signal provided when the programmable spatial filter 504 is set as a low-pass filter), the 3H3-tap low-pass filter output signal, and the 5H5-tap low-pass filter output signal.

As shown in FIG. 8, the spatial filtering block 24 simultaneously outputs a plurality of signals, specifically, the center pixel signal of the programmable spatial filter 504, an output signal of the selector 513 (i.e., the high-pass filter output signal of the programmable spatial filter 504, the high-frequency component outputted from the subtracter 510, or the high-frequency component outputted from the subtracter 511), an output signal of the selector 514 (i.e., the 3H3-tap low-pass filter output signal, or the 5H5-tap low-pass filter output signal), and the medium-frequency component outputted from the subtracter 512.

Also, the selector 515 selects and outputs one of the center pixel signal of the programmable spatial filter 504, the output signal from the selector 513, the output signal from the subtracter 512, the output signal from the selector 514, the 3H3-tap Sobel filter output signal, and the 5H5-tap Sobel filter output signal.

The multiplier 516 multiplies together the output signal (a high-frequency component) from the selector 513 and an arbitrary coefficient (RATHF) to provide an output, and the multiplier 517 multiplies together the output signal (medium-frequency component) from the subtracter 512 and an arbitrary coefficient (RATMF) to provide an output. The adder 518 adds together the output signal from the multiplier 516 and the output signal from the multiplier 517 to provide an output. The high-frequency component and medium-frequency component can thus be mixed at a desired ratio, by setting the coefficients (RATHF, RATMF) at desired values.

The output signal from the adder 518 can be arbitrarily utilized according to the purpose of the user, offering enhanced versatility.

The selector 530 selects and outputs one of a coefficient (RATCNT) and a coefficient (64-∀). The multiplier 531 multiplies together the center pixel signal of the programmable spatial filter 504 and the output signal from the selector 530 to provide an output. The multiplier 532 multiplies together the output signal from the selector 514 and a given coefficient to provide an output. This given coefficient is set to make a constant sum (desirably, "1") with the coefficient (64-∀) inputted to the selector 530. The direct-current component gain can be kept at a constant value because the sum of the coefficients is a constant value. The adder 533 adds together the output signal from the multiplier 531 and the output signal from the multiplier 532 to provide an output. It is possible, by setting the coefficient (64-∀) at a desired value, to obtain an output signal in which the center pixel signal and low-frequency component are mixed at a desired ratio. This output signal can be arbitrarily utilized according to the purpose, offering enhanced versatility.

The adder 535 adds together the output signal from the adder 533 and the output signal from the limiter 534 to provide an output. The output signal from the adder 533 contains direct-current component and low-frequency component, and the output signal from the limiter 534 contains high-frequency component and medium-frequency component. Accordingly, an output signal that contains direct-current component, low-frequency component, medium-frequency component, and high-frequency component is obtained by the adder 535 adding the output signal from the adder 533 and the output signal from the limiter 534. This output signal can be arbitrarily utilized according to the purpose, offering enhanced versatility.

The selector 536 selects and outputs one of the output signal from the adder 535 and the output signal from the selector 515.

The subtracter 519 subtracts the 3H3-tap low-pass filter output signal from the center pixel signal of the spatial filter 505 shown in FIG. 7, so as to generate a relatively narrow-band high-frequency component (HF-N). The subtracter 520 subtracts the 5H5-tap low-pass filter output signal from the center pixel signal of the spatial filter 505, so as to generate a relatively wide-band high-frequency component (HF-W).

The selector 521 selects and outputs one of the 3H3-tap low-pass filter output signal of the spatial filter 505 and the 5H5-tap low-pass filter output signal. The selector 522 selects and outputs one of the center pixel signal of the spatial filter 505, the output signal from the subtracter 519, the output signal from the subtracter 520, and the output signal of the selector 521.

The subtracter 523 subtracts the 3H3-tap low-pass filter output signal from the center pixel signal of the spatial filter 506 shown in FIG. 7, so as to generate a relatively narrow-band high-frequency component (HF-N). The subtracter 524 subtracts the 5H5-tap low-pass filter output signal from the center pixel signal of the spatial filter 506, so as to generate a relatively wide-band high-frequency component (HF-W).

The selector 525 selects and outputs one of the 3H3-tap low-pass filter output signal of the spatial filter 506 and the 5H5-tap low-pass filter output signal. The selector 526 selects and outputs one of the center pixel signal of the spatial filter 506, the output signal from the subtracter 523, the output signal from the subtracter 524, and the output signal of the selector 525.

Coring Block 25

The configuration of the coring block 25 is illustrated in FIG. 8. As shown in FIG. 8, the coring block 25 includes a coring circuit 601 connected to follow the adder 518, a coring circuit 602 connected to follow the selector 522, and a coring circuit 603 connected to follow the selector 526.

Color Suppression Block 26

Figure 9:
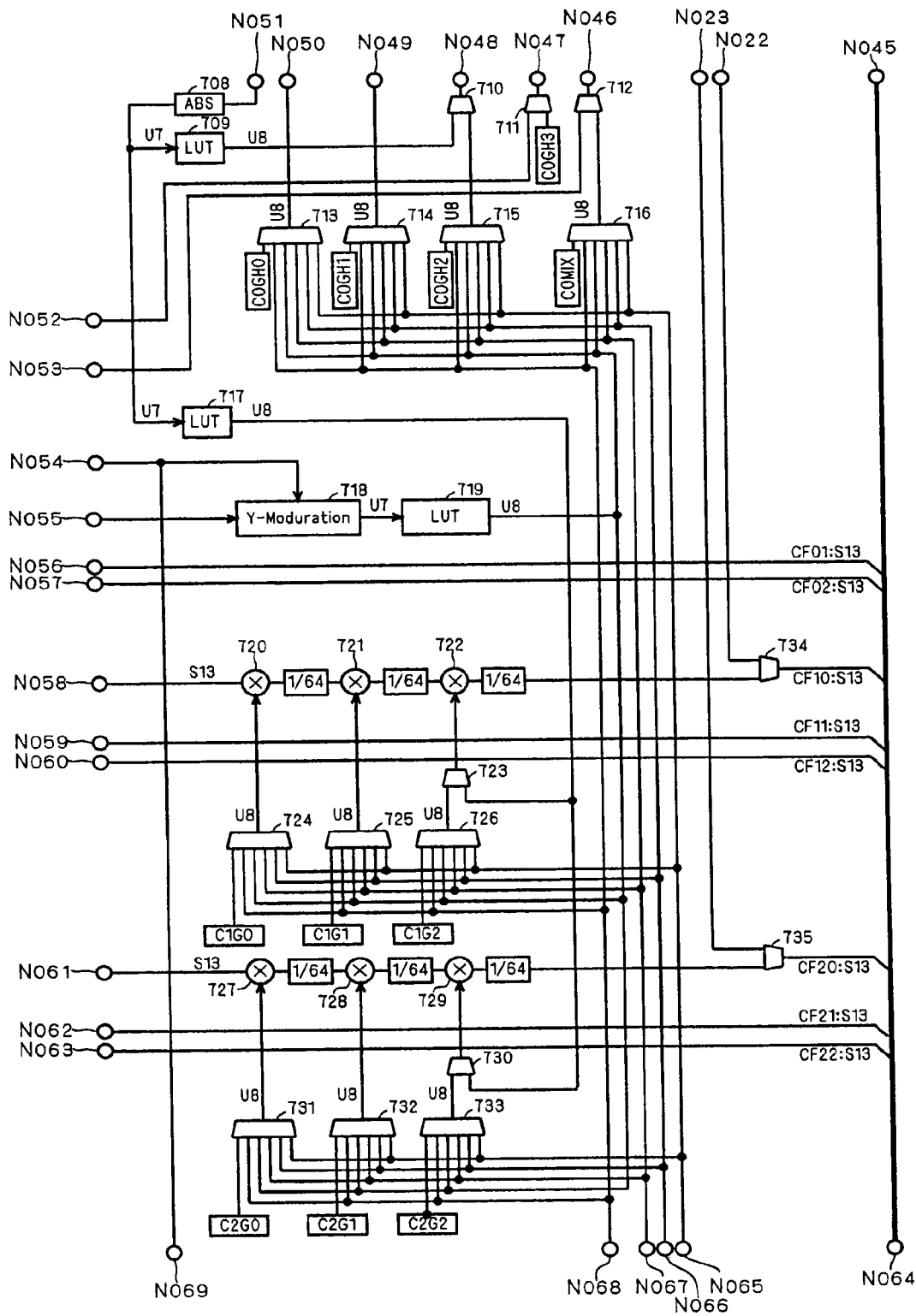
Figure 10:
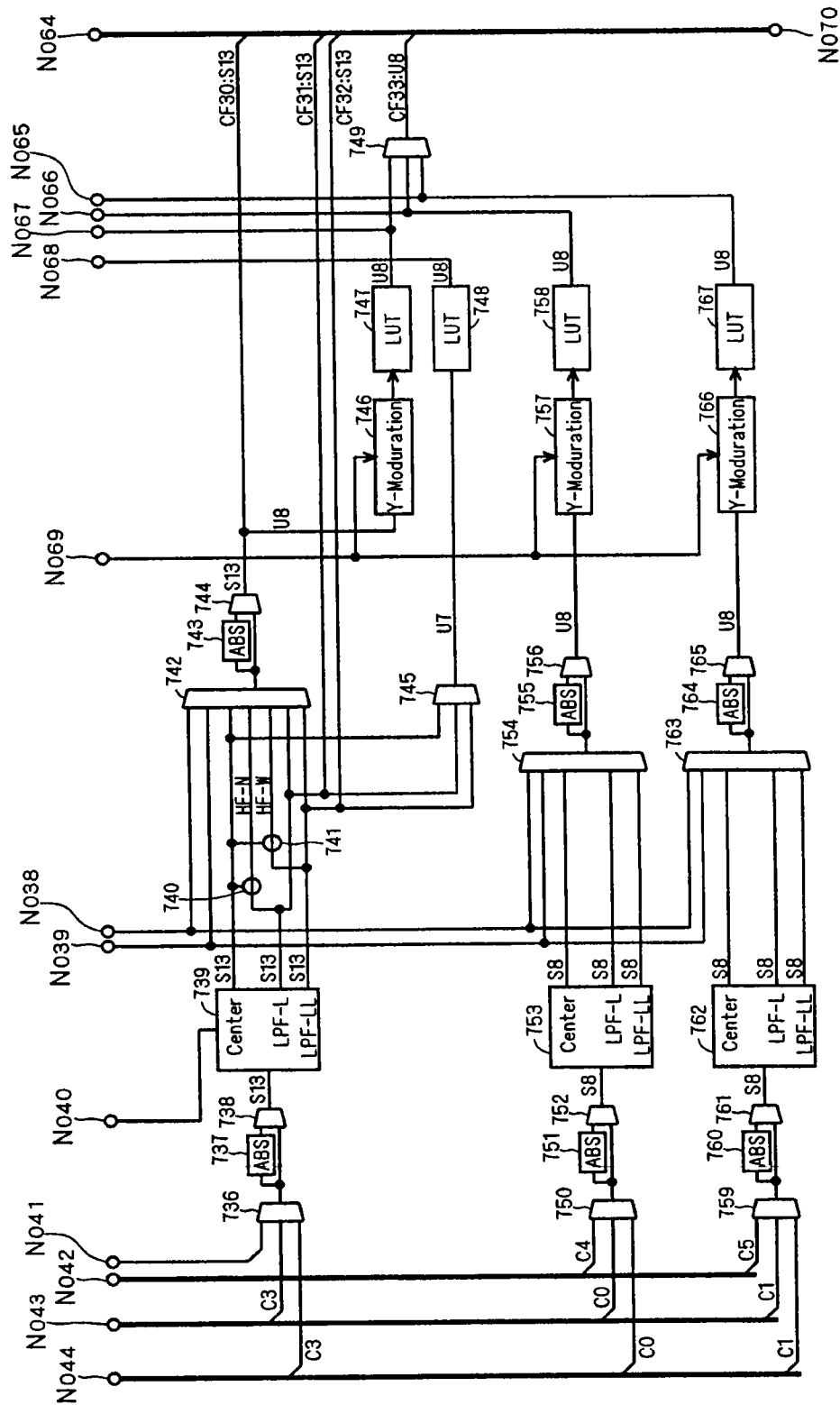

The configuration of the color suppression block (signal modulation block) 26 is illustrated in FIGS. 8 to 10. As shown in FIG. 10, the color suppression block 26 includes a spatial filter 739 corresponding to the color channel C3, a spatial filter 753 corresponding to the channel C4, and a spatial filter 762 corresponding to the channel C5.

The spatial filters 739, 753 and 762 are all 5H5-tap spatial filters, and they are each capable of outputting a center pixel signal (center), a low-pass filter output signal (LPF-L) from 3H3-tap fixed low-pass filter, and a low-pass filter output signal (LPF-LL) from 5H5-tap fixed low-pass filter.

A selector 736 receives as its input a KEY signal for modulation corresponding to the color channel C3 (or a fourth-color pixel signal) from the interpolation operation unit 208 shown in FIG. 5. The selector 736 is also capable of receiving as its inputs other modulation signals from the SDRAM 11 through the input DMA channels IN-CH2 and IN-CH3. The selector 736 selects and outputs one of the input signals. The output signal from the selector 736 is absolutized in an absolutizing circuit 737, and inputted to one input terminal of a selector 738. The other input terminal of the selector 738 directly receives the output signal from the selector 736. The selector 738 selects and outputs one of the input signals. The output signal from the selector 738 is inputted to the spatial filter 739 and low-pass-filtered in the spatial filter 739.

A subtracter 740 subtracts the 3H3-tap low-pass filter output signal from the center pixel signal of the spatial filter 739, so as to generate a relatively narrow-band, high-frequency component (HF-N). A subtracter 741 subtracts the 5H5-tap low-pass filter output signal from the center pixel signal of the spatial filter 739, so as to generate a relatively wide-band, high-frequency component (HF-W).

A selector 742 selects and outputs one of the center pixel signal and the high-pass filter output signal of the programmable spatial filter 504 shown in FIG. 7, the center pixel signal of the spatial filter 739 shown in FIG. 10, the output signal from the subtracter 740, the output signal from the subtracter 741, and the 3H3-tap low-pass filter output signal and the 5H5-tap low-pass filter output signal of the spatial filter 739.

The output signal from the selector 742 is absolutized in an absolutizing circuit 743 and inputted to one input terminal of a selector 744. The other input terminal of the selector 744 directly receives the output signal from the selector 742. The selector 744 selects and outputs one of the input signals.

A selector 750 receives as its input a pixel unit feature signal for modulation corresponding to the channel K0 (channel C4), from the interpolation operation unit 208 shown in FIG. 5. The selector 750 is also capable of receiving as its inputs other modulation signals from the SDRAM 11 through the input DMA channels IN-CH2 and IN-CH3. The selector 750 selects and outputs one of the input signals. The output signal from the selector 750 is absolutized in an absolutizing circuit 751 and inputted to one input terminal of a selector 752. The other input terminal of the selector 752 directly receives the output signal from the selector 750. The selector 752 selects and outputs one of the input signals. The output signal from the selector 752 is inputted to the spatial filter 753 and low-pass-filtered in the spatial filter 753.

In this way, the spatial filter 753 applies low-pass filtering to the pixel unit feature signal corresponding to the channel K0, whereby variations among individual pixels can be suppressed. This makes it possible to avoid considerable variations in the degree of modulation of individual pixels, when modulating the Y component (color channel C0), Cb component (color channel C1), and Cr component (color channel C2) on the basis of the pixel unit feature signal corresponding to the channel K0. As a result, even when a divergence occurs between a pixel as the source of generation of the pixel unit feature signal and a pixel as the target of modulation, it is possible to lower the degree of deterioration of image quality due to luminance or color divergence from the proper value, than when the pixel unit feature signal is not low-pass-filtered.

A selector 754 selects and outputs one of the center pixel signal and the high-pass filter output signal of the programmable spatial filter 504 shown in FIG. 7, and the center pixel signal, the 3H3-tap low-pass filter output signal, and the 5H5-tap low-pass filter output signal of the spatial filter 753 shown in FIG. 10.

The output signal from the selector 754 is absolutized in an absolutizing circuit 755 and inputted to one input terminal of a selector 756. The other input terminal of the selector 756 directly receives the output signal from the selector 754. The selector 756 selects and outputs one of the input signals.

A selector 759 receives as its input a pixel unit feature signal for modulation corresponding to the channel K1 (channel C5) from the interpolation operation unit 208 shown in FIG. 5. The selector 759 is also capable of receiving as its inputs other modulation signals from the SDRAM 11 through the input DMA channels IN-CH2, IN-CH3. The selector 759 selects and outputs one of the input signals. The output signal from the selector 759 is absolutized in an absolutizing circuit 760 and inputted to one input terminal of a selector 761. The other input terminal of the selector 761 directly receives the output signal from the selector 759. The selector 761 selects and outputs one of the input signals. The output signal from the selector 761 is inputted to the spatial filter 762 and low-pass-filtered in the spatial filter 762.

In this way, the spatial filter 762 applies low-pass filtering to the pixel unit feature signal corresponding to the channel K1, whereby variations among individual pixels can be suppressed. This makes it possible to avoid considerable variations in the degree of modulation of individual pixels, when modulating the Y component, Cb component, and Cr component on the basis of the pixel unit feature signal corresponding to the channel K1.

A selector 763 selects and outputs one of the center pixel signal and the high-pass filter output signal of the programmable spatial filter 504 shown in FIG. 7, and the center pixel signal, the 3H3-tap low-pass filter output signal, and the 5H5-tap low-pass filter output signal of the spatial filter 762 shown in FIG. 10.

The output signal from the selector 763 is absolutized in an absolutizing circuit 764 and inputted to one input terminal of a selector 765. The other input terminal of the selector 765 directly receives the output signal from the selector 763. The selector 765 selects and outputs one of the input signals.

Referring to FIG. 8, a selector 705 receives the center pixel signal of the programmable spatial filter 504 shown in FIG. 7, the 3H3-tap low-pass filter output signal, and the 5H5-tap low-pass filter output signal. The selector 705 selects and outputs one of the input signals.

Referring to FIG. 10, the output signal from the selector 744 is modulated in a luminance modulation unit 746 on the basis of the luminance component output signal from the selector 705 shown in FIG. 8, and then further modulated in a lookup table 747. The output signal from the selector 756 is modulated in a luminance modulation unit 757 on the basis of the luminance component output signal from the selector 705 shown in FIG. 8, and then further modulated in a lookup table 758. The output signal from the selector 765 is modulated in a luminance modulation unit 766 on the basis of the luminance component output signal from the selector 705 shown in FIG. 8, and then further modulated in a lookup table 767. A selector 749 selects and outputs one of the output signals from the lookup tables 747, 758 and 767.

A selector 745 selects and outputs one of the center pixel signal of the spatial filter 739, the 3H3-tap low-pass filter output signal, and the 5H5-tap low-pass filter output signal. The output signal from the selector 745 is modulated by a lookup table 748.

Referring to FIG. 8, a selector 706 selects and outputs one of the output signal from the subtracter 512, the high-pass filter output signal, the 3H3-tap Sobel filter output signal, and the 5H5-tap Sobel filter output signal of the programmable spatial filter 504 shown in FIG. 7. The output signal from the selector 706 is absolutized in an absolutizing circuit 707. The output signal from the absolutizing circuit 707 is modulated in a luminance modulation unit 718 shown in FIG. 9 on the basis of the luminance component output signal from the selector 705 shown in FIG. 8, and then further modulated in a lookup table 719 shown in FIG. 9.

Referring to FIG. 9, selectors 713 to 716, 724 to 726, and 731 to 733 each receive the output signal from the lookup table 719, and the output signals from the lookup tables 747, 748, 758, 767 shown in FIG. 10. The selectors 713 to 716, 724 to 726, and 731 to 733 also receive given coefficients, respectively.

An absolutizing circuit 708 absolutizes the output signal from the coring circuit 601 shown in FIG. 8 and outputs it. Lookup tables 709 and 717 modulate the output signal from the absolutizing circuit 708.

A selector 710 selects and outputs, the output signal from the lookup table 709 and the output signal from the selector 715. A selector 711 selects and outputs a given coefficient and a modulation parameter sent from the SDRAM 11 through the input DMA channel IN-CH2 or IN-CH3. A selector 712 selects and outputs the output signal from the selector 716 and a modulation parameter sent from the SDRAM 11 through the input DMA channel IN-CH2 or IN-CH3.

A selector 723 selects and outputs the output signal from the lookup table 717 and the output signal from the selector 726. A selector 730 selects and outputs the output signal from the lookup table 717 and the output signal from the selector 733.

Referring to FIG. 8, a multiplier 701 multiplies together the output signal from the coring circuit 601 corresponding to Y component (high-frequency component, medium-frequency component, or mixture component thereof) and the output signal from the selector 713 shown in FIG. 9 to provide an output. A multiplier 702 multiplies together the output signal from the multiplier 701 and the output signal from the selector 714 shown in FIG. 9 to provide an output. A multiplier 703 multiplies together the output signal from the multiplier 702 and the output signal from the selector 710 shown in FIG. 9 to provide an output. A multiplier 704 multiplies together the output signal from the multiplier 703 and the output signal from the selector 711 shown in FIG. 9 to provide an output. The output signal from the multiplier 704 is inputted to the adder 535 through the limiter 534. In this way, the output signal from the coring circuit 601 can be arbitrarily modulated by the multipliers 701 to 704 by using modulating signals generated by arbitrarily modulating pixel unit feature signals, which offers enhanced versatility.

Referring to FIG. 9, a multiplier 720 multiplies together the output signal from the selector 724 and the output signal from the coring circuit 602 corresponding to Cb component, shown in FIG. 8, to provide an output. A multiplier 721 multiplies together the output signal from the multiplier 720 and the output signal from the selector 725 to provide an output. A multiplier 722 multiplies together the output signal from the multiplier 721 and the output signal from the selector 723 to provide an output. A selector 734 selects and outputs the output signal from the multiplier 722 and an output signal (maximum value) from the noise reduction circuit 507 shown in FIG. 7.

A multiplier 727 multiplies together the output signal from the selector 731 and the output signal from the coring circuit 603 corresponding to Cr component, shown in FIG. 8, to provide an output. A multiplier 728 multiplies together the output signal from the multiplier 727 and the output signal from the selector 732 to provide an output. A multiplier 729 multiplies together the output signal from the multiplier 728 and the output signal from the selector 730 to provide an output. A selector 735 selects and outputs the output signal from the multiplier 729 and an output signal (minimum value) from the noise reduction circuit 507 shown in FIG. 7.

In this way, the color suppression block 26 is capable of arbitrarily modulating the pixel unit feature signals that are modulating signals for modulating signals to be modulated (luminance signal high-frequency component and medium-frequency component, or color signals), by using the absolutizing circuits 751, 755, 760, 764, the luminance modulation units 757, 766, and the lookup tables 758, 767 shown in FIG. 10. This makes it possible to arbitrarily modulate the signals to be modulated, according to the purpose, thus offering enhanced versatility.

Second Color-Space Transformation Block 27

The configuration of the second color-space transformation block 27 is illustrated in FIG. 11. As shown in FIG. 11, the second color-space transformation block 27 includes a color-space transformation circuit 801.

The color-space transformation circuit 801 is capable of performing matrix operation of 4-channel inputs and 4-channel outputs. For example, it transforms a YCbCr color-space (YUV color-space) image signal into an RGB color-space or YMCW color-space image signal and outputs it. It is also capable of outputting a YCbCr color-space image signal without transforming it, when a coefficient for the color-space transformation circuit 801 is set to such a value as not to effect color-space transformation.

In this way, the spatial filtering block 24, the coring block 25, and the color suppression block 26 perform various operations using YCbCr color-space image signals, and then the second color-space transformation block 27 transforms them into, e.g., the RGB color space, whereby an output signal of a desired color space is finally obtained and the versatility is thus enhanced.

Second Gamma-Correction Block 28

The configuration of the second gamma-correction block 28 is illustrated in FIG. 11. As shown in FIG. 11, the second gamma-correction block 28 includes a gamma correction unit 901 that is capable of performing conversion from 12-bit system to 8-bit system using lookup tables etc., independently for individual color channels C0 to C3. The gamma correction unit 901 is connected to follow the color-space transformation circuit 801.

In this way, the first color-space transformation block 23, the spatial filtering block 24, the coring block 25, the color suppression block 26, and the second color-space transformation block 27 perform various operations using 12-bit-system image signals, and then the second gamma-correction block 28 performs gamma correction to convert them to 8-bit-system image signals. Thus, an output signal of a desired number of bits is finally obtained and the versatility is thus enhanced.

Resizing Block 29

The configuration of the resizing block 29 is illustrated in FIG. 11. The resizing block 29 is configured to perform image resolution conversion, and as shown in FIG. 11, the resizing block 29 includes four resizers 1001 to 1004. The resizer 1001 is capable of processing 12-bit-system input signals, and the resizers 1002 to 1004 are capable of processing 8-bit-system input signals. The resizer 1001 is also capable of processing 8-bit-system input signals when the high order 4 bits are set to "0".

The image signals that have been gamma-corrected in the gamma correction unit 901 are inputted to the resizers 1001 to 1004 through selection by a selector 1005. Then, the resizers 1001 to 1004 perform resolution conversion, and the signals are transferred through the output DMA channels OUT-CH0 to OUT-CH3 for storing in the SDRAM 11 or display in the LCD 7. In this way, when the input signal to the resizing block 29 is of 8-bit system, not only the resizers 1002 to 1004 but also the resizer 1001 are used to perform resolution conversion. Accordingly, the resizer 1001 is not wasted when the input signal is of 8-bit system.

An image signal that is not subjected to gamma correction in the gamma correction unit 901 is inputted from the color-space transformation circuit 801 to the resizer 1001 through the selector 1005. Then, the resolution is converted in the resizer 1001 and it is stored in the SDRAM 11 or recorded in the memory card 13 through the output DMA channel OUT-CH0.

In this way, while a 12-bit-system signal for main image and an 8-bit system signal for display or for thumbnail image are inputted as input signals to the resizing block 29, it is possible to select which resizer or resizers are to be used according to the number of bits of the input signal, among the resizer 1001 and the resizers 1002 to 1004 configured to process signals of different numbers of bits. Furthermore, the circuit scale can be smaller than when all resizers 1001 to 1004 are provided as resizers capable of processing 12-bit-system input signals.

Two-Dimensional Lookup Table 402

Now, the two-dimensional lookup table 402 shown in FIG. 6 will be described in detail. As explained earlier, the two-dimensional lookup table 402 is connected to the output terminals of the color channels C1 and C2 of the color-space transformation circuit 401, and it transforms the values of Cb- and Cr-component pixel signals to desired values, using previously set arbitrary transform values representing a correspondence between pairs of input data values and pairs of output data values.

FIG. 12 is a diagram showing an example of setting of transform values in the two-dimensional lookup table. The horizontal axis shows the values of first data X inputted to the two-dimensional lookup table, and the vertical axis shows the values of second data Y inputted to the two-dimensional lookup table. FIG. 12 shows an example in which both of the data X and Y are data with a sign, and the maximum value of both data X and Y is "2047" and their minimum value is "−2048".

In the two-dimensional lookup table, mesh intersections V(p, q) are defined at intervals of 256 digits both in vertical and horizontal directions. The values p and q are integers of not less than −8 nor more than 8. Transform values (x, y), representing output values for data X and Y, are set at each intersection V(p, q). For example, when the input values to the two-dimensional lookup table are (X, Y)=(256, 512), the data is inputted to the intersection V(1, 2) and the transform values (x, y)=(256, 512) set at that intersection V(1, 2) are outputted as the output values from the two-dimensional lookup table. The input values (X, Y) and the output values (x, y) are equal in this example because FIG. 12 shows an example of a non-transforming two-dimensional lookup table, but arbitrary transform values (x, y) can be set at the intersections V(p, q).

In the two-dimensional lookup table, the transform values (x, y) are discretely defined only at the mesh intersections V(p, q), and so the circuit scale can be smaller than when transform values are defined in correspondence with all input values.

The first color-space transformation block 23 performs color-space transformation by real-time processing. Accordingly, when the color-space transformation is performed using a three-dimensional lookup table that involves large amounts of calculations, then the processing in the three-dimensional lookup table will form a bottleneck to delay the entire processing. Also, a three-dimensional lookup table involves a very large circuit scale. In contrast, using a two-dimensional lookup table avoids increased circuit scale and achieves high-speed color-space transformation without delaying the entire processing.

When the input data has values not defined as an intersection V(p, q), the transform values corresponding to the input values can be calculated by interpolation using the transform values at the four intersections surrounding the input values. When input values (Xin, Yin) are surrounded by four intersections $V_0$ (X0, Yin0), $V_1$(X0, Yin1), $V_2$(X1, Yin0), and $V_3$(X1, Yin1), then vector data about the intersection $V_0$, (DT0X(X0, Yin0), DT0Y(X0, Yin0)), vector data about the intersection $V_1$, (DT1X(X0, Yin1), DT1Y(X0, Yin1)), vector data about the intersection $V_2$, (DT2X(X1, Yin0), DT2Y(X1, Yin0)), and vector data about the intersection $V_3$, (DT3X(X1, Yin1), DT3Y(X1, Yin1)), are obtained. Where X0#Xin<X1 or X0<Xin#X1, Yin0#Yin<Yin1 or Yin0<Yin#Yin1.

Then, the transform values (Xout, Yout) corresponding to the input values (Xin, Yin) are calculated by the interpolation shown below.

$$Xout = $$
$$(X1 - Xin)/(X1 - X0) * \{(Y1 - Yin)/(Y1 - Y0) * DT0X(X0, Yin0) + $$
$$(Yin - Y0)/(Y1 - Y0) * DT1X(X0, Yin1)\} + $$
$$(Xin - X0)/(X1 - X0) * \{(Y1 - Yin)/(Y1 - Y0) * DT2X(X0, Yin0) + $$
$$(Yin - Y0) * DT3X(X0, Yin1)\}$$
$$Yout = (X1 - Xin)/(X1 - X0) * \{(Y1 - Yin)/(Y1 - Y0) * DT0Y(X0, Yin0) + $$
$$(Yin - Y0)/(Y1 - Y0) * DT1Y(X0, Yin1)\} + (Xin - X0)$$
$$(X1 - X0) * \{(Y1 - Yin)/(Y1 - Yin)/(Y1 - Y0) * DT2Y(X1, Yin0) + $$
$$(Yin - Y0)/(Y1 - Y0) * DT3Y(X1, Yin1)\}$$

In the two-dimensional lookup table 402 shown in FIG. 6, one of the vertical and horizontal axes shows Cb-component values and the other shows Cr-component values. Then, arbitrary transform values (Cb, Cr) are set at individual intersections V(p, q) using the values of Cb component and Cr component, whereby the two-dimensional lookup table 402 applies arbitrary color transformation to the image signal outputted from the color-space transformation circuit 401. For example, it applies color transformation for enhancing the saturation of skin color of people or blue of the sky, or color transformation for matching a particular color shifted from a standard color chart with a color on the color chart.

Since the YCbCr color space only involves two-channels of color signals, it is possible to transform all two-channel color signals outputted from the color-space transformation circuit 401 by using the two-dimensional lookup table 402, without a need to use a three-dimensional lookup table.

FIG. 13 is a diagram showing another example of the two-dimensional lookup table. While the intersections V(p, q) of FIG. 12 are arranged at equal intervals, the mesh of the example of FIG. 13 is finer in a central area of the two-dimensional lookup table, and thus a larger number of intersections are defined in the central area. That is, the degree of discreteness of transform values is set smaller in the area in which the absolute values of input data are smaller (region near gray) than in the area where the absolute values are larger. In this way, the transform values are densely set in the region near gray, which makes it possible to apply finer transformation in the area near gray that is more frequently contained in normal picture images.

Figure 14:
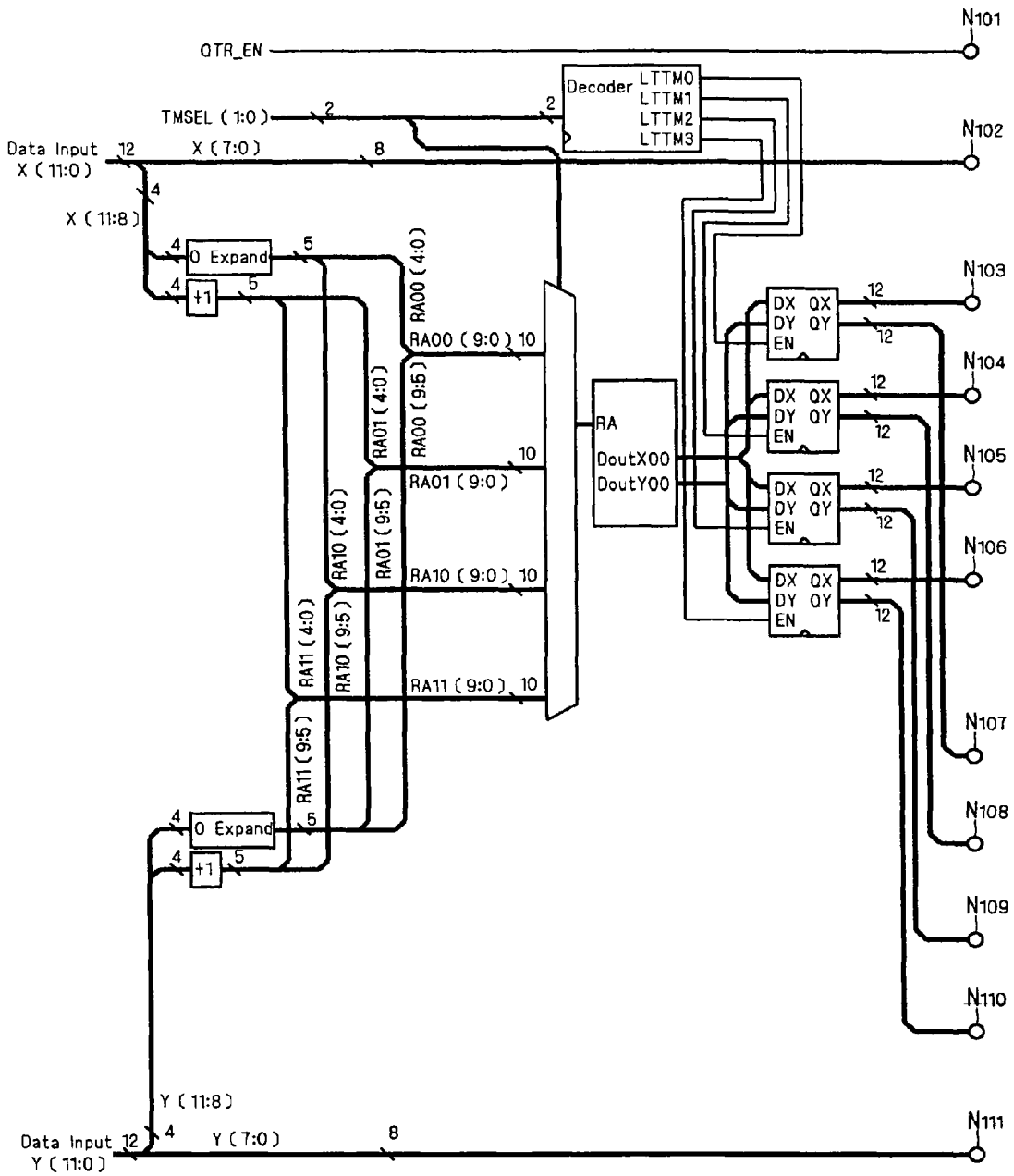
Figure 16:
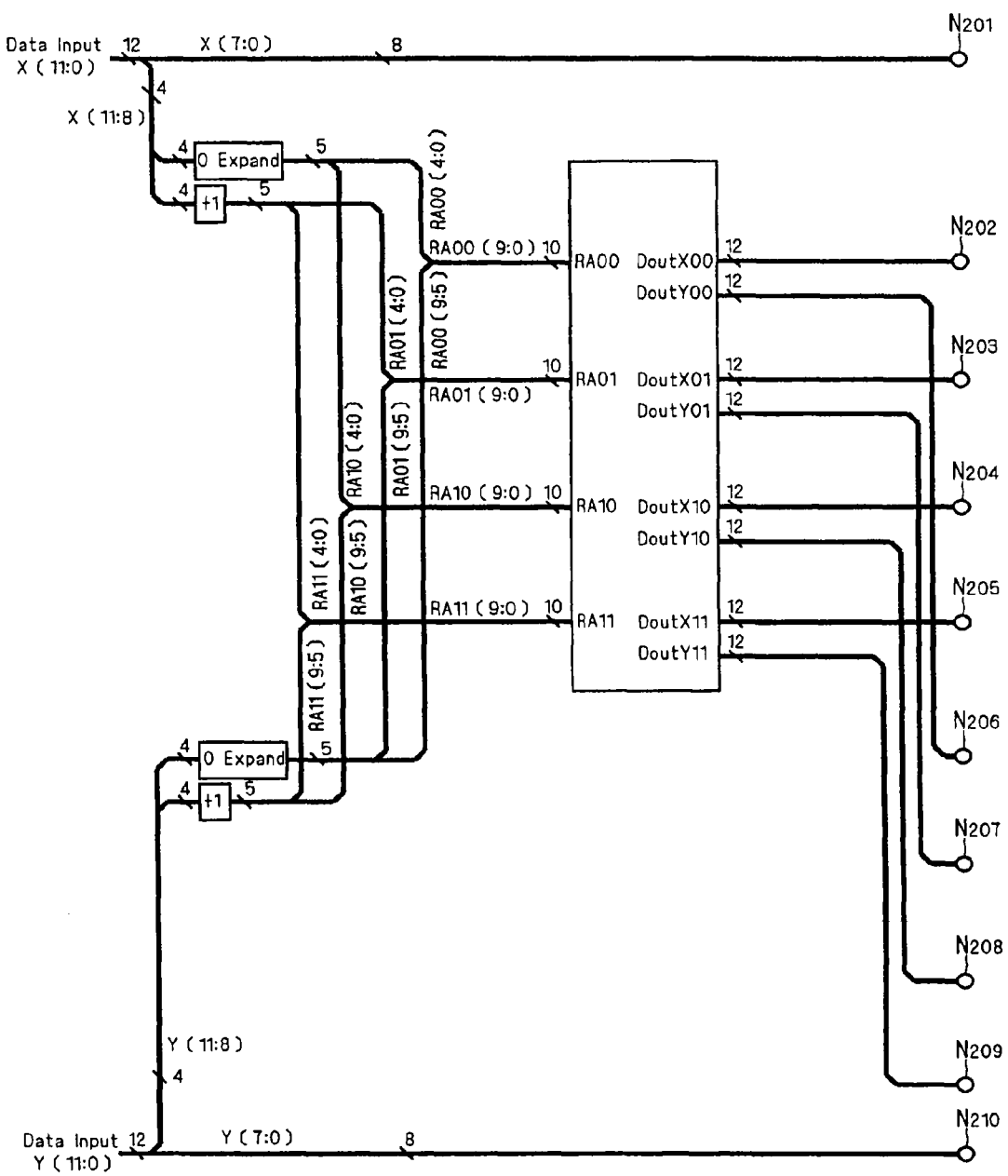
FIGS. 16 and 17 are circuit diagrams showing a second example of specific configuration of the two-dimensional lookup table.
Figure 17:
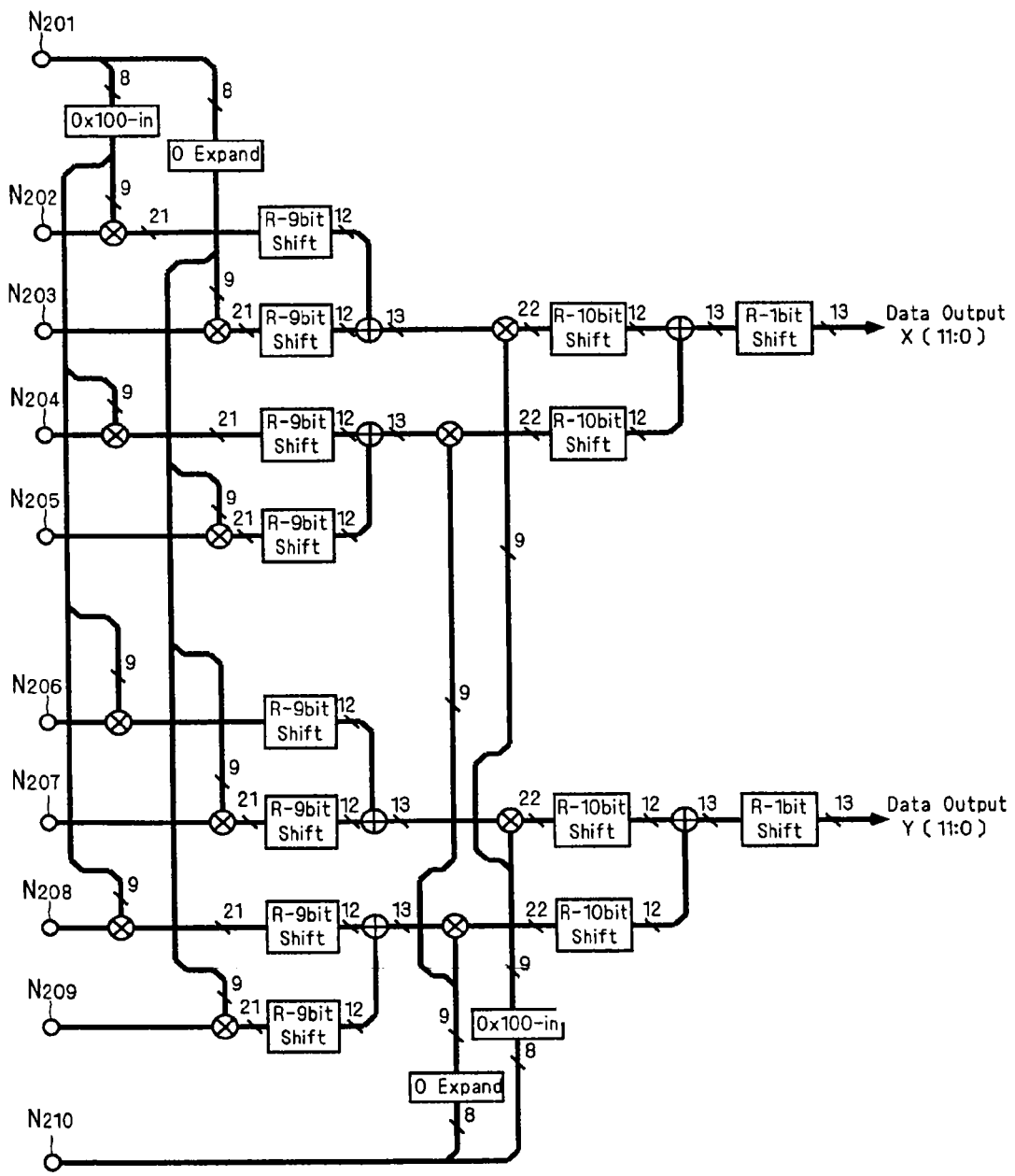

FIGS. 14 and 15 are circuit diagrams showing a first example of specific configuration of the two-dimensional lookup table. FIGS. 14 and 15 are connected together at the connection points $N_{101}$ to $N_{111}$ of the same numbers. Also, FIGS. 16 and 17 are circuit diagrams showing a second example of specific configuration of the two-dimensional lookup table. FIGS. 16 and 17 are connected together at the connection points $N_{201}$ to $N_{210}$ of the same numbers. The first example shows a configuration using single-port memory, and the second example shows a configuration using 4-port memory. The first example requires four clocks to input four pairs of transform values for interpolation into the memory, while the second example requires only a single clock because it can simultaneously input four pairs of transform values into the memory.

While the invention has been described in detail, the foregoing description is in all aspects illustrative and not restrictive. It is understood that numerous other modifications and variations can be devised without departing from the scope of the invention.

What is claimed is:

1. An image processing apparatus comprising:
   a plurality of image processing blocks that are capable of real-time processing of an image signal inputted from outside, said plurality of image processing blocks including a resizing block that applies an image resizing to an input signal,
   said resizing block comprising,
      a first resizing circuit capable of processing a signal with a first number of bits; and
      a second resizing circuit capable of processing a signal with a second number of bits that is smaller than said first number of bits,
      wherein, when said input signal that is input to said resizing block is of said first number of bits, said first resizing circuit performs said resizing to said input signal, and
      when said input signal that is input to said resizing block is of said second number of bits, said second resizing circuit performs said resizing to said input signal.

2. The image processing apparatus according to claim 1, wherein, when said input signal that is input to said resizing block is of said second number of bits, each of said first and second resizing circuits performs said resizing to said input signal.

3. The image processing apparatus according to claim 1, wherein
said plurality of image processing blocks further include a gamma correction block that precedes said resizing block and that converts a signal of said first number of bits to a signal of said second number of bits,
and wherein an output signal from said gamma correction block is inputted to said second resizing circuit, and
said resizing block further comprises a selector that selects the output signal from said gamma correction block and an input signal to said gamma correction block to provide an input to said first resizing circuit.

* * * * *